(12) United States Patent
Shimada et al.

(10) Patent No.: US 12,140,093 B2
(45) Date of Patent: Nov. 12, 2024

(54) ELECTRONIC CONTROL DEVICE FOR MIXED HYDROGEN COMBUSTION, AND METHOD FOR CONTROLLING HYDROGEN MIXING RATIO

(71) Applicant: HITACHI, LTD., Tokyo (JP)

(72) Inventors: Atsushi Shimada, Tokyo (JP); Yoshihiro Sukegawa, Tokyo (JP); Kengo Kumano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/562,857

(22) PCT Filed: Apr. 20, 2022

(86) PCT No.: PCT/JP2022/018301
§ 371 (c)(1),
(2) Date: Nov. 21, 2023

(87) PCT Pub. No.: WO2022/259771
PCT Pub. Date: Dec. 15, 2022

(65) Prior Publication Data
US 2024/0263593 A1 Aug. 8, 2024

(30) Foreign Application Priority Data
Jun. 7, 2021 (JP) ................. 2021-094910

(51) Int. Cl.
*F02D 35/02* (2006.01)
*F02D 41/00* (2006.01)
*F02D 41/40* (2006.01)

(52) U.S. Cl.
CPC ....... *F02D 35/028* (2013.01); *F02D 41/0087* (2013.01); *F02D 41/401* (2013.01)

(58) Field of Classification Search
CPC ... F02D 41/0087; F02D 41/401; F02D 35/028
See application file for complete search history.

(56) References Cited

U.S. PATENT DOCUMENTS

| | | | |
|---|---|---|---|
| 10,415,512 B2 | 9/2019 | Kimura | |
| 2018/0142629 A1* | 5/2018 | Stockner | ............... F02D 35/023 |
| 2018/0313299 A1 | 11/2018 | Kimura | |

FOREIGN PATENT DOCUMENTS

| | | | |
|---|---|---|---|
| JP | 2008144637 A | * | 6/2008 |
| JP | 2014-058882 A | | 4/2014 |

(Continued)

OTHER PUBLICATIONS

International Search Report and Written Opinion of the International Search Authority of PCT/JP2022/018301 dated Jul. 19, 2022.

*Primary Examiner* — Kevin A Lathers
(74) *Attorney, Agent, or Firm* — MATTINGLY & MALUR, PC

(57) ABSTRACT

An electronic control device for mixed hydrogen combustion includes a combustion timing detection unit that detects the combustion timing of an engine; and an abnormal state detection unit that detects an abnormal state, in which a type of abnormality occurring in the engine has been determined, on the basis of the combustion timing and a second fuel supply ratio calculated from the supply amount of hydrocarbon fuel supplied by a first fuel supply device and the supply amount of a second fuel supplied by a second fuel supply device. A control mode determination unit determines a control mode corresponding to the abnormal state, controls the supply amount of hydrogen to be supplied by the second fuel supply device on the basis of the control mode, and outputs the control mode to an engine controller for controlling the engine.

14 Claims, 12 Drawing Sheets

(56) References Cited

FOREIGN PATENT DOCUMENTS

| JP | 2018-188990 A | 11/2018 |
| JP | 2020-023975 A | 2/2020 |

\* cited by examiner

FIG. 2

|  | LIGHT OIL_(JIS:1) | HEAVY OIL_(A) | BIODIESEL | BIO-OIL |
|---|---|---|---|---|
| FLASH POINT_[K] | >323 | >333 | >393 | 590 |
| BOILING POINT_[K] | 513–623 | >623 | 630 | 735 |
| KINEMATIC VISCOSITY [mm$^2$/s] (30°C) | 2.8 | <20 | 4.5 | 50.8 |
| CETANE NUMBER | 55 | 52 | 60.4 | 37.6 |

FIG. 11

| ENGINE OPERATING CONDITIONS | PHASE DETERMINATION | ABNORMAL REGION NUMBER | ABNORMAL MODE | CONTROL MODE |
|---|---|---|---|---|
| NORMAL OPERATION | PHASE LAG ANGLE ABNORMALITY | 1 ONLY | MISFIRING OF SECOND FUEL | INCREASE SUPPLY AMOUNT OF SECOND FUEL |
| | | 1 and 3 and 5 | ABNORMALITY OCCURRED IN ALL CYLINDERS → DROP IN HYDROGEN CONCENTRATION IN SECOND FUEL | CONTROL INJECTION TIMING OF FIRST FUEL |
| | | | ABNORMALITY OCCURRED IN SOME CYLINDERS → INJECTION ABNORMALITY OF INJECTOR OF FIRST FUEL | IMPLEMENT SWITCHING OF FIRST FUEL IN CASE OF NO ENHANCEMENT, INJECTOR ABNORMALITY FLAG ON |
| | PHASE LEAD ANGLE ABNORMALITY | 2 and 4 and 6 | CHECK LONG-TERM CHANGES OVER TIME → ACTUAL COMPRESSION RATIO ABNORMALITY DUE TO ASH ACCUMULATION | IMPLEMENT SWITCHING OF FIRST FUEL CONTROL SECOND FUEL SUPPLY AMOUNT, ENGINE MAINTENANCE NOTIFICATION |
| | | | CHECK SHORT-TERM EXCESSIVE CHANGES → SECOND FUEL COMPONENT ABNORMALITY | STOP SUPPLY OF SECOND FUEL, SERVICE AND MAINTENANCE OF HYDROGEN GENERATION DEVICE |
| | | 6 ONLY | 6 ONLY: ABNORMAL COMBUSTION | REDUCE SECOND FUEL RATIO · CONTROL INJECTION TIMING OF FIRST FUEL |
| VARIABLE OPERATION | PHASE ABNORMALITY | OCCURRED IN ANY REGION | ABNORMALITY OF FUEL INJECTION SYSTEM OF FIRST FUEL (CLOGGING OF FILTER, PIPE, PUMP ABNORMALITY) | IMPLEMENT SWITCHING OF FIRST FUEL ENGINE MAINTENANCE NOTIFICATION |

ELECTRONIC CONTROL DEVICE FOR MIXED HYDROGEN COMBUSTION, AND METHOD FOR CONTROLLING HYDROGEN MIXING RATIO

TECHNICAL FIELD

The present invention relates to an electronic control device for mixed hydrogen combustion, and a method for controlling a hydrogen mixing ratio.

BACKGROUND ART

As a decarbonization system for reducing the use of fossil fuels, a mixed hydrogen combustion engine system utilizing hydrogen generated by renewable energy has been studied for power generation, cogeneration, and the like. Because the combustion speed of hydrogen is about seven times or more that of a conventional hydrocarbon fuel, it is possible to improve thermal efficiency by adjusting the supply of hydrogen.

On the other hand, a combustion state such as a combustion timing greatly changes depending on the supply amount of hydrogen, and abnormal combustion such as backfire, afterfire, pre-ignition, and knocking may occur. When such abnormal combustion occurs, the engine may fail in some cases. In addition, hydrogen is a fuel having high flammability, but has a flammability range similarly to other hydrocarbon fuels, and unburned hydrogen that does not burn out outside the flammability range is discharged to outside the engine. The presence of unburned hydrogen leads to a reduction in thermal efficiency. A technique for promoting combustion of an air-fuel mixture containing hydrogen is disclosed in PTLs 1 and 2.

PTL 1 discloses a method of controlling an engine using two types of fuels, namely, hydrogen and a hydrocarbon fuel. For example, PTL 1 indicates that "by providing the ignition plug in a position where more gas flowing into the cylinder from the second intake port than gas flowing into the cylinder from the first intake port hits, it is possible to suppress hydrogen flowing in from the first intake port from coming into contact with the ignition plug at a high temperature.".

PTL 2 discloses a method of controlling an engine using two types of fuel, namely, gas fuel and diesel fuel. For example, PTL 2 indicates that "in a case where it is determined that an abnormality has occurred in the engine, the control device performs control to instantaneously switch to the diesel mode, and determines a supply amount of the liquid fuel after the instantaneous switch to the diesel mode, based on an engine speed and an engine load".

CITATION LIST

Patent Literature

PTL 1: JP 2018-188990 A
PTL 2: JP 2020-23975 A

SUMMARY OF INVENTION

Technical Problem

By using the method disclosed in PTL 1 described above, it has been considered possible to reduce the probability of contact with the ignition plug that locally heats up in a combustion chamber and reduce abnormal combustion during hydrogen combustion. However, there is a case where it is difficult to avoid abnormal combustion when a hydrogen supply amount changes, environmental conditions such as intake air temperature or humidity change, or when operating conditions and a state in a combustion chamber of the engine undergo temporal changes. In addition, because hydrocarbon and hydrogen are supplied by different injection valves, hydrocarbon fuel and hydrogen are difficult to mix uniformly, and unburned hydrogen is likely to be generated under low temperature conditions. As described above, in PTL 1, there is a case where it is difficult to suppress abnormal combustion due to hydrogen and to suppress discharge of unburned hydrogen.

In the method disclosed in PTL 2, in a case where an electronic control unit (ECU) determines abnormal combustion from an average effective pressure corresponding to the torque or combustion torque of an engine, it is considered that combustion switching control that takes into account the effect of an environmental change can be performed by stopping the supply of gas fuel and switching to a diesel combustion mode using only diesel fuel. However, in the method disclosed in PTL 2, accurate torque information is required, and thus the accuracy of determining abnormal combustion of the engine is reduced. In addition, because an in-cylinder pressure sensor is required for the ECU to ascertain the average effective pressure, a large cost is required for installing the in-cylinder pressure sensor in order to detect the combustion state. In addition, the combustion mode switched by the ECU when an abnormality occurs in the engine is only the diesel combustion mode, and the ratio between the gas fuel and the diesel fuel at the time of the abnormality is not disclosed in PTL 2. Therefore, there is a problem that the range in which the engine can be operated using gas fuel becomes narrow.

The present invention was conceived in view of such a situation, and an object of the present invention is to correctly detect an abnormal state of a mixed hydrogen combustion engine and appropriately control a mixing ratio of hydrogen to be supplied to the engine.

Solution to Problem

The electronic control device for mixed hydrogen combustion according to the present invention controls a mixing ratio of hydrogen mixed in a combustion chamber of a mixed hydrogen combustion engine having a first fuel supply device that supplies a hydrocarbon fuel to the engine as a first fuel and a second fuel supply device that supplies a fuel partially containing hydrogen to the engine as a second fuel.

The electronic control device for mixed hydrogen combustion comprises a combustion timing detection unit that detects a combustion timing of the engine; an abnormal state detection unit that detects an abnormal state in which a type of an abnormality occurring in the engine is determined based on the combustion timing, a supply amount of a hydrocarbon fuel supplied by a first fuel supply device, and a second fuel supply ratio calculated from a supply amount of the second fuel supplied by a second fuel supply device; and a control mode determination unit that determines a control mode corresponding to the abnormal state, controls a supply amount of the hydrogen supplied by the second fuel supply device on the basis of the control mode, and outputs the control mode to an engine controller that controls the engine.

Advantageous Effects of Invention

According to the present invention, it is possible to detect a combustion abnormality of a mixed hydrogen combustion engine without providing an in-cylinder pressure sensor, and thus it is possible to operate an engine of various fuels that partially runs on hydrogen as a fuel at low cost. In addition, because optimum control according to the abnormal state of the engine can be performed, the maximum amount of hydrogen can be supplied to the engine. Furthermore, because the abnormal state of the engine is eliminated, the engine can be operated for a long period of time.

Problems, configurations, advantageous effects, and the like other than those described above will be clarified by the descriptions of the embodiments hereinbelow.

BRIEF DESCRIPTION OF DRAWINGS

FIG. 2 is a list of physical property values of fuel used in the engine system according to the first embodiment of the present invention.

FIG. 11 is a list illustrating a correspondence relationship between an abnormal mode and a control mode of an engine according to the first embodiment of the present invention.

DESCRIPTION OF EMBODIMENTS

Hereinafter, modes for carrying out the present invention will be described with reference to the accompanying drawings. In the present specification and the accompanying drawings, constituent elements having substantially the same function or configuration are denoted by the same reference signs, and redundant descriptions thereof are omitted.

First Embodiment

Figure 1:
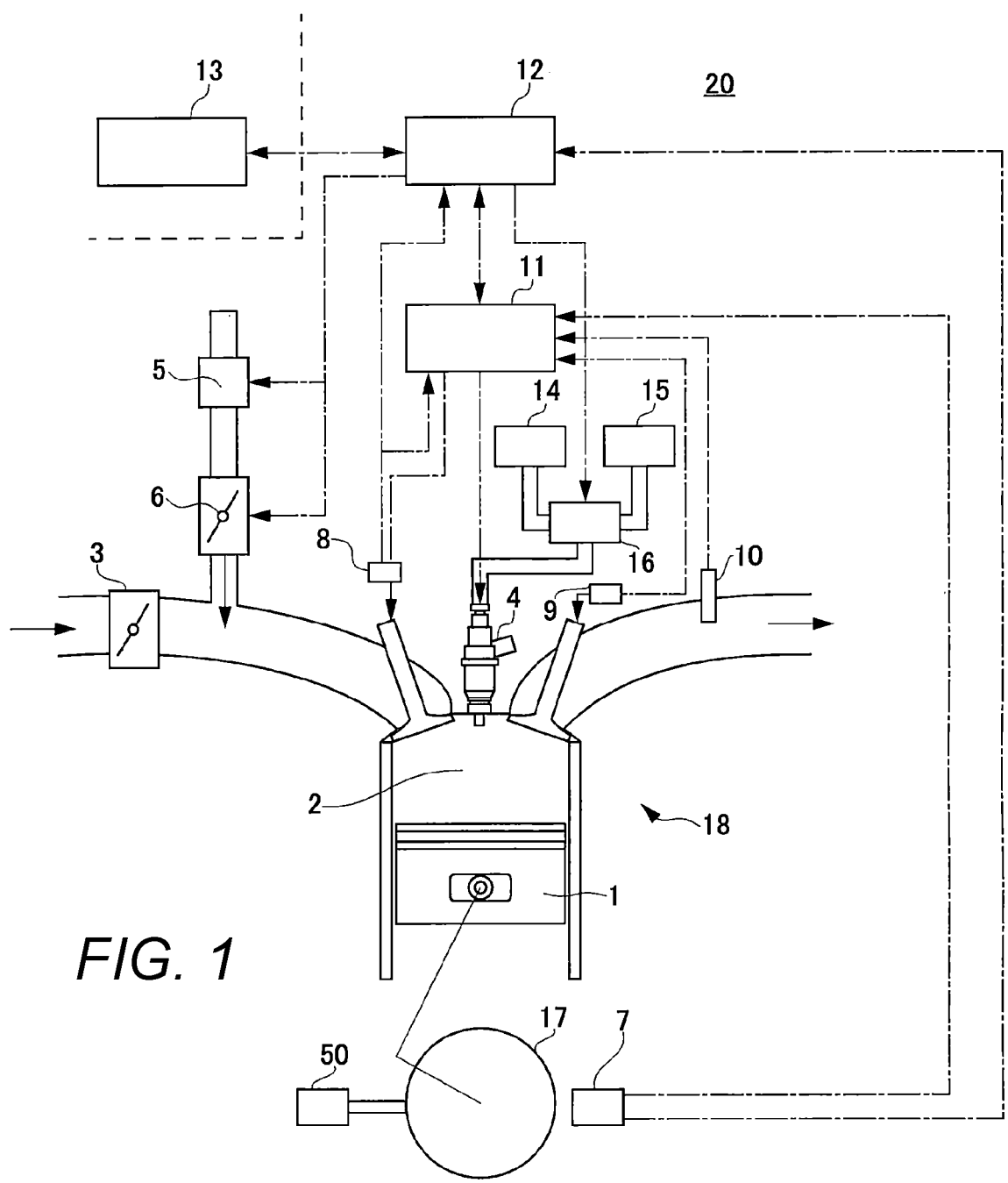
FIG. 1 is a schematic diagram of an engine system according to a first embodiment of the present invention.

FIG. 1 is a schematic diagram of an engine system 20. An engine system 20 includes an engine 18 that uses hydrogen as a fuel part.

In the engine system 20, hydrocarbon fuel serving as first fuel is directly injected into a combustion chamber 2 by an injector 4 (an example of a fuel injection device). The compression of a piston 1 causes the first fuel supplied to the combustion chamber 2 to have a high temperature and a high pressure, and the self-ignition combustion of the first fuel generates torque in the piston 1. The vertical movement of the piston 1 is converted into the rotational movement of a crankshaft 17. A generator 50 is connected to the crankshaft 17, and a generator 50 generates power as the crankshaft 17 rotates.

An intake pipe of the engine 18 is provided with a throttle valve 3, and the opening degree of the throttle valve 3 is adjusted by an engine controller 11, and thus the amount of air taken in from the intake pipe to the combustion chamber 2 changes. The opening degree of the throttle valve 3 is detected by an opening degree sensor (not illustrated) and outputted to the engine controller 11.

Here, the first fuel and the second fuel will be described with reference to FIG. 2.

FIG. 2 is a list of physical property values of fuel used in the engine system 20.

FIG. 2 illustrates the flash point [K], the boiling point [K], the kinematic viscosity [mm$^2$/s] of the fuel at 30° C., and the cetane number for light oil (No. 1 of Japanese Industrial Standards (JIS)), A☐type heave oil (one type of JIS), biodiesel, and bio-oil.

The first fuel injected directly into the combustion chamber 2 is, for example, any of light oil, heavy oil, biodiesel fuel (BDF: Bio Diesel Fuel (registered trademark)), bio-oil fuel, and synthetic fuel. Biodiesel fuel is a fuel having a low kinematic viscosity that uses organic resources (biomass) derived from renewable organisms as raw materials. A bio-oil fuel is a fuel in which organic resources are the raw materials, similarly to biodiesel fuel, but which has a kinematic viscosity higher than that of biodiesel fuel because same is almost unprocessed. A synthetic fuel is a hydrocarbon fuel produced from hydrogen and $CO_2$.

The engine system 20 includes fuel tanks 14 and 15 that store a first fuel of at least two types. A fuel tank 14 (an example of a high-viscosity fuel tank) stores, for example, heavy oil, bio-oil fuel, and the like having high kinematic viscosity. On the other hand, a fuel tank 15 (an example of a low-viscosity fuel tank) stores, for example, light oil, biodiesel fuel, or the like having a kinematic viscosity lower than that of the first fuel stored in the fuel tank 14.

Further, the engine system 20 includes a switching unit 16 that switches either of the fuel tanks 14 and 15 and supplies the first fuel to the injector 4. The switching operation of the switching unit 16 is controlled by an instruction from an electronic control device 12 for mixed hydrogen combustion. Information on executing the switching operation is reported from the electronic control device 12 for mixed hydrogen combustion to the engine controller 11. The switching unit 16 then switches the supply source of the first fuel (either of the fuel tanks 14 and 15). For example, during normal usage of the engine 18, the switching unit 16 outputs the first fuel supplied from the fuel tank 14 to the injector 4. In a case where an abnormality occurs in the engine 18, the switching unit 16 switches the supply source of the first fuel from the fuel tank 14 to the fuel tank 15, takes out the first fuel from the fuel tank 15, and supplies the first fuel to the injector 4. The injector 4 is an example of a first fuel supply device that supplies hydrocarbon fuel as first fuel to an engine (engine 18).

In the engine system 20, the gas fuel serving as the second fuel is supplied to the intake pipe of the engine 18 by a flow rate adjustment device 6, and is supplied to the combustion chamber 2 in a state of being mixed with air. In the combustion chamber 2, the first fuel and the second fuel are mixed. The premixed gas of the second fuel and the air is then heated by the self-ignition combustion of the first fuel in the combustion chamber 2, and the second fuel is combusted. Such combustion of the first fuel and the second fuel is referred to as "dual combustion" and will be described below.

The second fuel is a gas that partially uses hydrogen as a fuel, and is, for example, any of a hydrogen-rich gas, a natural gas partially containing hydrogen, a biogas partially containing hydrogen, a synthetic gas partially containing hydrogen, ammonia, and a reformed gas. The reformed gas is a gas obtained by reforming any of natural gas, biogas, biofuel such as ethanol, ammonia, and synthetic fuel. A hydrogen generation device 5 is either an electrolysis device that decomposes water into hydrogen and oxygen, or a reformer into which a catalyst is inserted. The hydrogen generation device 5 and the flow rate adjustment device 6 are used as an example of a second fuel supply device that supplies fuel partially containing hydrogen as the second fuel to the engine (the engine 18).

In a case where the hydrogen generation device 5 is an electrolysis device, electricity generated by renewable energy obtained from a power generation system (not shown) such as solar power generation or wind power generation is utilized as electricity supplied to the hydrogen generation device 5. In a case where the hydrogen generation device 5 is a reformer, hydrocarbon fuel or ammonia is supplied to the reformer, and one or more of the exhaust heat and cooling water heat of the engine 18 is supplied to the reformer.

The electronic control device 12 for mixed hydrogen combustion may supply electricity to the reformer to operate the reformer. A hydrogen storage device may be provided between the hydrogen generation device 5 and the flow rate adjustment device 6 (not shown). The hydrogen storage device is any one of a tank for hydrogen, a hydrogen storage alloy, and an organic hydride, and is capable of storing hydrogen generated by the hydrogen generation device 5, and of removing the hydrogen according to a request from the flow rate adjustment device 6. In a case where a hydrogen storage alloy or an organic hydride is used as the hydrogen storage device, one or more of the exhaust heat and cooling water heat of the engine 18 is supplied to the hydrogen storage alloy or the organic hydride.

The engine controller 11 includes an engine rotation sensor 7 and a cam rotation sensor 8 that detect the rotation timing of the engine 18. The engine controller 11 controls the injection timing of the second fuel injected from the injector 4 on the basis of the detection results of the engine rotation sensor 7 and the cam rotation sensor 8. Further, the engine controller 11 controls the injection timing control of the second fuel on the basis of the rotational speed and torque of the engine 18 and a signal of an oxygen concentration sensor 10 in the exhaust gas. A part of the second fuel contains hydrogen. For this reason, dual combustion is established in a premixed gas of the second fuel and the air even in a ratio of excess air than the stoichiometric ratio, that is, a high excess air ratio condition. Therefore, the dual combustion is established by adding the second fuel to the intake air of the conventional diesel combustion engine 18.

The electronic control device 12 for mixed hydrogen combustion is a device that controls a mixing ratio of hydrogen that undergoes mixed combustion in a combustion chamber (combustion chamber 2) of a mixed hydrogen combustion engine (engine 18) that includes the first fuel supply device and the second fuel supply device described above. The electronic control device 12 for mixed hydrogen combustion detects the combustion timing of the engine 18 on the basis of the detection results of the engine rotation sensor 7 and the cam rotation sensor 8. The electronic control device 12 for mixed hydrogen combustion then controls the flow rate adjustment device 6 and the hydrogen generation device 5 on the basis of the detected combustion timing of the engine 18, and controls the flow rate of the supply of hydrogen supplied to the engine 18.

The energy management system 13 is provided separately from the engine system 20, and manages the overall energy of energy that includes renewable energy, and fuel energy used by the engine system 20. For example, the energy management system 13 manages the whole of the renewable energy generated by a solar power generation system or the like and the fuel energy of the engine system 20 controlled by the electronic control device 12 for mixed hydrogen combustion. Therefore, one energy management system 13 is capable of managing the energy of a plurality of engine systems 20. For example, the engine controller 11 and the electronic control device 12 for mixed hydrogen combustion are provided in a factory, and the energy management system 13 is provided in the same factory or in the cloud. Therefore, the energy management system 13 is also capable of managing the energy of the engine controller 11 and the electronic control device 12 for mixed hydrogen combustion which are installed in locations separate from one other.

The electronic control device 12 for mixed hydrogen combustion has a function for communicating various types of information with the energy management system 13. The electronic control device 12 for mixed hydrogen combustion then sends and receives the second fuel supply ratio, the power output of a generator (the generator 50), which is mechanically connected to the engine (engine 18), the amount of heat recovered from the exhaust heat of the engine (engine 18), and the abnormal state or the control state of the engine (engine 18) through communication with an energy management system (the energy management system 13) that controls the renewable energy.

Here, the supply ratio [%] of the second fuel is a value represented by [(calorific value of the second fuel)/(calorific value of the entire fuel supplied to the engine 18)×100].

For example, the electronic control device 12 for mixed hydrogen combustion controls the hydrogen generation device 5 and the flow rate adjustment device 6 on the basis of the energy supply and demand balance of the energy management system 13. In addition, the electronic control device 12 for mixed hydrogen combustion transmits, to the energy management system 13, the state of the engine 18 detected by various sensors 19 present in the engine 18 (see FIG. 3 described below) and content for implementing the engine control. The energy management system 13 is capable of formulating a hydrogen generation plan on the basis of the information obtained from the electronic control device 12 for mixed hydrogen combustion.

The electronic control device 12 for mixed hydrogen combustion may be mounted inside the engine controller 11.

Figure 3:
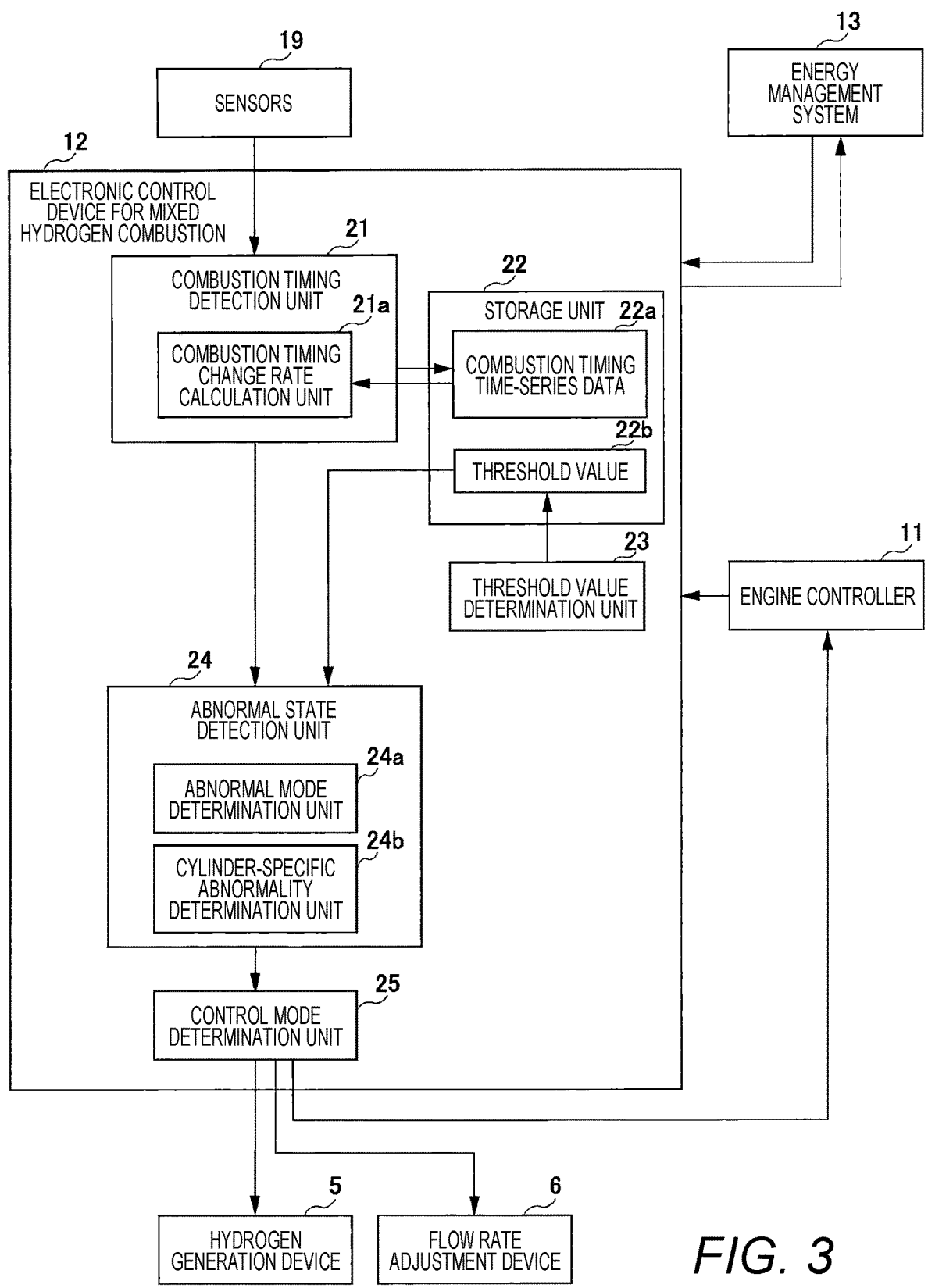
FIG. 3 is a block diagram illustrating an internal configuration example of an electronic control device for mixed hydrogen combustion according to the first embodiment of the present invention.

FIG. 3 is a block diagram illustrating an internal configuration example of an electronic control device 12 for mixed hydrogen combustion.

The electronic control device 12 for mixed hydrogen combustion includes a combustion timing detection unit 21, a storage unit 22, a threshold value determination unit 23, an abnormal state detection unit 24, and a control mode determination unit 25.

The combustion timing detection unit (combustion timing detection unit 21) detects the combustion timing of the engine (engine 18). For example, the combustion timing detection unit 21 detects the combustion timing on the basis of detection results inputted from the sensors 19. The sensors 19 are various sensors provided in the existing engine 18, and include an opening sensor of the throttle valve 3 and the like in addition to the engine rotation sensor 7 and cam rotation sensors 8 and 9, which are illustrated in FIG. 1. The cam rotation sensor 8 detects the rotation of an intake cam attached to the intake valve, and the cam rotation sensor 9 detects the rotation of an exhaust cam attached to the exhaust valve. The combustion timing detection unit (combustion timing detection unit 21) then detects the combustion timing by using at least one or more of the information outputted from the engine rotation sensor (engine rotation sensor 7) for detecting changes in the rotation of the engine (engine 18) and the information outputted from the cam sensor (cam rotation sensor 8) for detecting changes in the rotation of the cam shaft of the engine (engine 18).

In the engine system 20 according to the present embodiment, it is not necessary to add a new sensor to the engine 18. The combustion timing detected by the combustion timing detection unit 21 is written as combustion timing time-series data 22a in the storage unit 22. The combustion timing time-series data 22a is data that stores, in time series, the past combustion timing detected by the combustion timing detection unit 21.

The combustion timing detection unit 21 includes a combustion timing change rate calculation unit 21a.

The combustion timing change rate calculation unit (the combustion timing change rate calculation unit 21a) calculates the change rate of the combustion timing on the basis of the time-series data (combustion timing time-series data 22a) of the combustion timing detected in the past.

The storage unit 22 stores, in time series, the combustion timing detected by the combustion timing detection unit 21. The combustion timings stored in time series in this manner are collected as the combustion timing time-series data 22a.

In the storage unit 22, the supply ratio threshold value and the combustion timing threshold value of the second fuel, which are determined by the threshold value determination unit 23, are stored as a threshold value 22b. The supply ratio threshold value and the combustion timing threshold value are determined according to the relational expression illustrated in FIG. 10 (described below).

The threshold value determination unit 23 determines threshold values (the threshold values $X_1$, $X_2$, $Y_1$, and $Y_2$ illustrated in FIG. 10 (described below)) that serve as a reference for the abnormal state detection unit 24 to determine an abnormal state of the engine 18. The threshold value determination unit 23 uses the engine control information inputted from the engine controller 11 to determine the threshold values. Examples of the engine control information include the engine speed, torque of the engine 18, water temperature of the engine 18, intake air temperature of the engine 18, the type of the first fuel, and the type of the second fuel. The threshold value determination unit (threshold value determination unit 23) then determines the supply ratio threshold value and the combustion timing threshold value of the second fuel on the basis of at least one or more of the speed of the engine (engine 18), the torque of the engine (engine 18), the rotational speed of the generator (generator 50) mechanically connected to the engine (engine 18), the voltage of the generator (generator 50), the current of the generator (generator 50), the torque of the generator (generator 50), the water temperature of the engine (engine 18), the intake air temperature of the engine (engine 18), the type of the first fuel, and the type of the second fuel.

The abnormal state detection unit (abnormal state detection unit 24) detects an abnormal state in which the type of abnormality occurring in the engine (engine 18) is determined based on the combustion timing and the second fuel supply ratio calculated from the supply amount of the hydrocarbon fuel supplied by the first fuel supply device and the supply amount of the second fuel supplied by the second fuel supply device. The combustion timing is detected by the combustion timing detection unit 21, and the supply amounts of the first fuel and the second fuel are inputted to the engine 18 from the existing sensors 19. Further, the abnormal state detection unit (abnormal state detection unit 24) includes an abnormal mode determination unit 24a that determines, as an abnormal mode, one or a plurality of abnormal states occurring in the engine (engine 18) on the basis of the magnitude of the second fuel supply ratio with respect to the supply ratio threshold value of the second fuel, and delayed or premature combustion timing, which is determined from a combustion timing threshold value which takes, as a reference, normal combustion timing (the value of the relational expression Y illustrated in FIG. 10) with respect to the second fuel supply ratio. The detection results of the abnormal states of the engine 18 detected by the abnormal state detection unit 24 are represented by abnormal region numbers, as illustrated in FIGS. 10 and 11 described below. Further, the abnormal region numbers are outputted to the control mode determination unit 25.

The abnormal state detection unit 24 detects whether the state of the engine 18 is a normal state or an abnormal state. As illustrated in FIG. 10 described below, in the present embodiment, a plurality of threshold values ($X_1$, $X_2$) are set for the supply ratio (X) of the second fuel, and a plurality of threshold values ($Y_1$, $Y_2$) are set for a Formula (Y) for calculating the combustion centroid timing that changes according to the second fuel supply ratio, and these threshold values are read from the storage unit 22. The combustion centroid represents a combustion phase at which the combustion mass ratio is 50%, and the combustion centroid timing represents the timing at which the combustion centroid is established.

Further, if the combustion centroid timing (Y) calculated with respect to the second fuel supply ratio is within the range of the threshold values ($Y_1$, $Y_2$), it is determined that the engine 18 is in a normal state. On the other hand, if the combustion centroid timing (Y) is out of the range of the threshold values ($Y_1$, $Y_2$), it is determined that the engine 18 is in an abnormal state. As illustrated in FIG. 10, the abnormal states of the engine 18 can be classified into six abnormal regions divided into two abnormal types that depend on the combustion centroid timing such as whether the combustion centroid timing with respect to the second fuel supply ratio is equal to or greater than the threshold value ($Y_1$) or less than the threshold value ($Y_2$), and three abnormal types in which the second fuel supply ratio is less than the threshold value ($X_1$), equal to or greater than the threshold ($X_1$) and less than the threshold ($X_2$), and equal to or greater than the threshold ($X_2$). Further, the six abnormal regions are identified by the abnormal region numbers "1" to "6".

The abnormal state detection unit 24 includes a cylinder-specific abnormality determination unit 24b in addition to the abnormal mode determination unit 24a.

Figure 10:
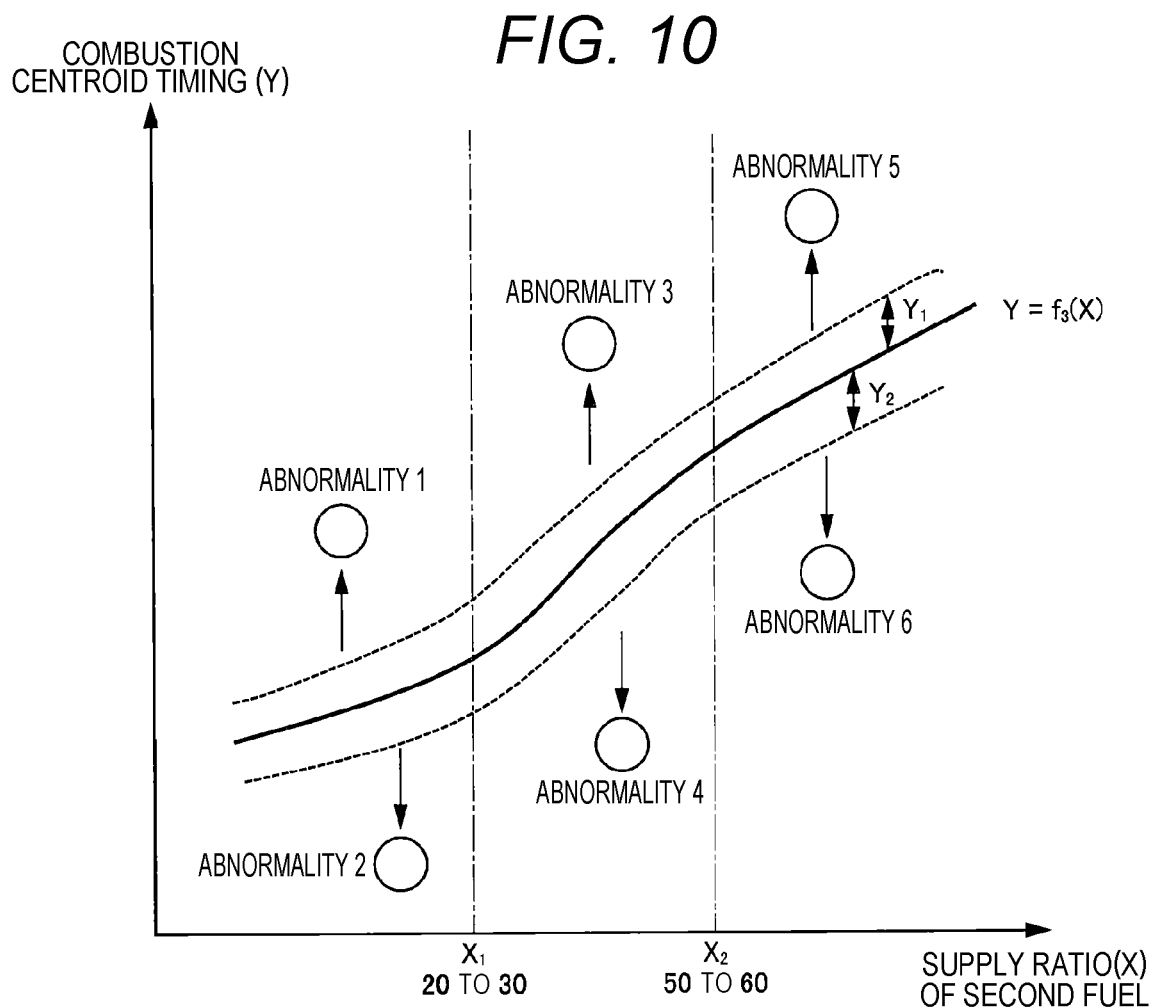
FIG. 10 is a diagram illustrating a method of engine abnormality determination performed by an abnormal state detection unit according to the first embodiment of the present invention.

The abnormal mode determination unit 24a determines which of the abnormal modes indicated by the abnormal region numbers illustrated in FIG. 10 an abnormal state of the engine 18 corresponds to. The abnormal mode indicates the content of the abnormality occurred in the engine 18 specified for each abnormal region number. Here, the abnormal mode determination unit 24a included in the abnormal state detection unit 24 determines the abnormal mode on the basis of the map information stored in advance in the storage unit and the threshold value 22b read from the storage unit 22.

The cylinder-specific abnormality determination unit (cylinder-specific abnormality determination unit 24b) determines an abnormal state for each cylinder of the engine (engine 18). Therefore, the cylinder-specific abnormality determination unit 24b is capable of determining whether an abnormality has occurred in all the cylinders or the abnormality has occurred in only some of the cylinders. The abnormal mode determination unit 24a determines an abnormal state for each cylinder in which an abnormality has occurred.

A control mode determination unit (the control mode determination unit 25) determines a control mode corresponding to the abnormal state detected by the abnormal state detection unit 24, controls the supply amount of hydrogen supplied by the second fuel supply device on the basis of the control mode, and outputs the control mode to an engine controller (the engine controller 11) for controlling the engine (engine 18). Then, the engine controller 11 and the electronic control device 12 for mixed hydrogen combustion control the supply amounts of the first fuel and the second fuel according to the control mode. The engine controller 11 controls various actuators for operating the engine 18 according to the control mode. For example, the engine controller 11 controls the switching unit 16 to switch the type of the first fuel supplied from the fuel tank 14 or 15 and control the injection timing of the first fuel. The electronic control device 12 for mixed hydrogen combustion controls the hydrogen generation device 5 to increase or decrease the hydrogen generation amount, and controls the flow rate adjustment device 6 to adjust the hydrogen flow rate. Details of the control mode will be described below with reference to FIG. 11.

The control mode determination unit 25 also transmits the control mode to the energy management system 13. At this time, the abnormal state detection unit 24 may output an abnormal mode determination result to the energy management system 13. The energy management system 13 manages the current control state and abnormal state of the engine 18 on the basis of the control mode received from the control mode determination unit 25.

Figure 4:
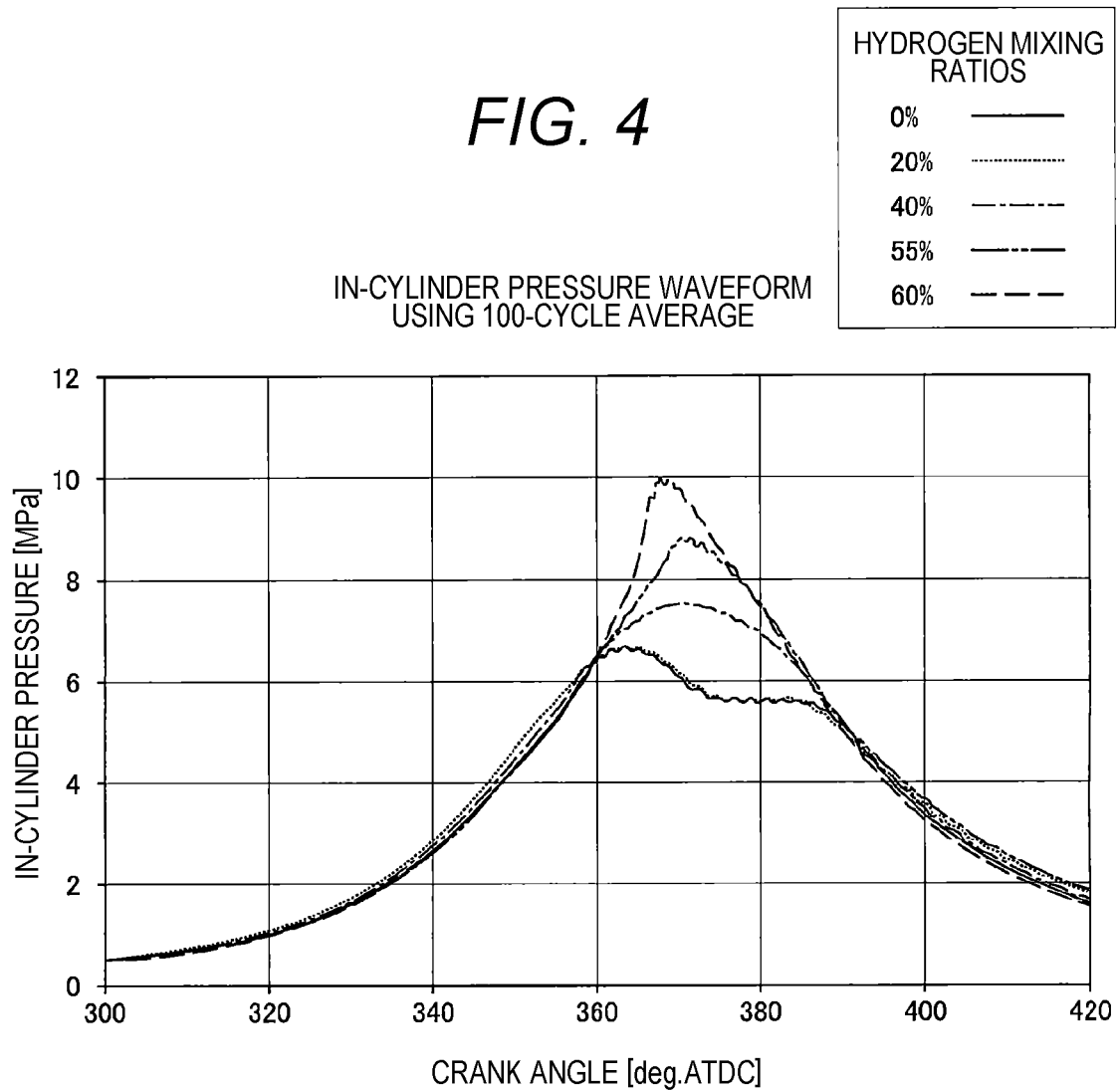
FIG. 4 is a diagram illustrating an example of a 100-cycle average of a combustion pressure waveform of an engine according to the first embodiment of the present invention.

FIG. 4 is a diagram illustrating an example of a 100-cycle average of a combustion pressure waveform of the engine 18. In FIG. 4, the horizontal axis represents the crank angle [deg.ATDC], and the vertical axis represents the in-cylinder pressure [MPa].

In FIG. 4, the 100-cycle average of the combustion pressure measured by changing the hydrogen mixing ratio, which is the ratio of hydrogen in the total fuel supplied to the engine 18, to 0%, 20%, 40%, 55%, and 60% is shown as combustion pressure waveforms. The combustion pressure waveform of a conventional engine 18 not using hydrogen is expressed by a hydrogen mixing ratio of 0%. The combustion pressure waveforms with a hydrogen mixing ratio of 0% and 20% are shown to almost overlap each other.

As can be seen from FIG. 4, as the hydrogen mixing ratio increases, the combustion pressure rises at an early timing, the maximum pressure increases, and the timing of the maximum pressure is accelerated. It is also clear that the combustion pressure waveforms are greatly different between the hydrogen mixing ratios of 55% and 60%. The reason why the combustion pressure waveforms are different as described above is that when the hydrogen mixing ratio is 60%, a cycle in which abnormal combustion occurs is included among the 100 cycles.

Figure 5:
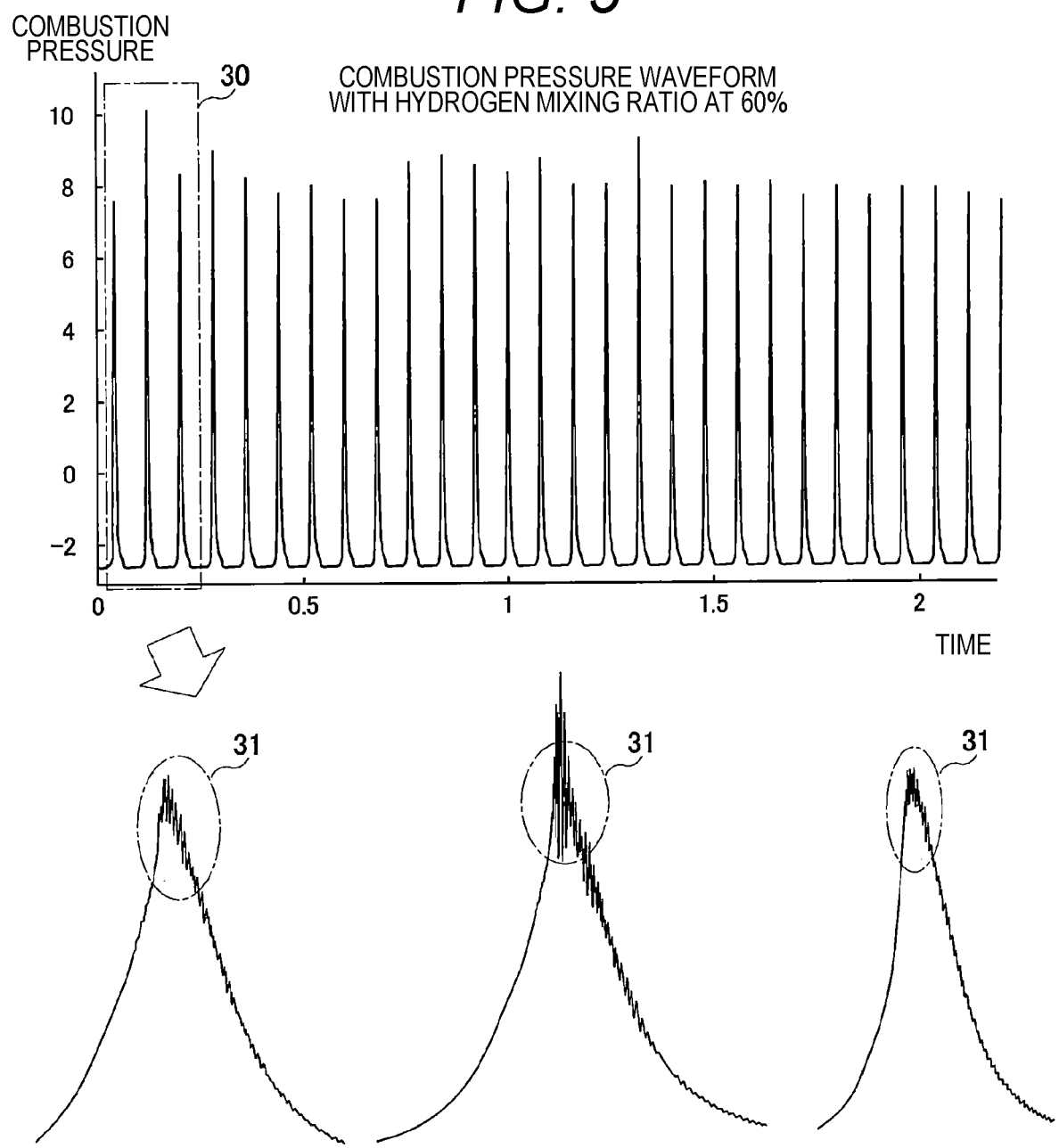
FIG. 5 is a diagram illustrating an example of a combustion pressure waveform for each cycle according to the first embodiment of the present invention.

FIG. 5 is a diagram illustrating an example of a combustion pressure waveform for each cycle. In FIG. 5, the horizontal axis represents time, and the vertical axis represents combustion pressure.

In the upper part of FIG. 5, an example of a combustion pressure waveform for each cycle at a hydrogen mixing ratio of 60% is shown. An enlarged view of the combustion pressure waveform included in the rectangular frame 30 at the left end of the combustion pressure waveform in FIG. 5 is illustrated in the lower part of FIG. 5. As illustrated in FIG. 4, when the hydrogen mixing ratio becomes 60%, there is a large number of cycles in which abnormal combustion occurs.

A top part 31 of the combustion pressure waveform illustrated in the lower part of FIG. 5 illustrates a characteristic of the combustion pressure waveform at the time of knocking in which the hydrogen mixing ratio is a predetermined value or more at which abnormal combustion is likely to occur. When the hydrogen mixing ratio is a predetermined value or more, the probability that such combustion occurs increases. In addition, the higher the temperature of the air supplied to the engine 18 or the temperature of the cooling water of the engine 18, the higher the probability of knocking occurring. As another abnormal combustion, the hot surface ignition that occurs when contact is made with a member at a high temperature in the combustion chamber 2 is likely to occur under conditions where the hydrogen mixing ratio, the intake air temperature, and the cooling water temperature are high, similarly to the increase in the probability of knocking occurring.

When such abnormal combustion occurs in the engine 18, the engine controller 11 cannot control the combustion timing of the engine 18 within a normal range, and thus the thermal efficiency of the engine 18 deteriorates. Furthermore, the engine 18 may fail due to an increase in the timing of the rise in pressure in the combustion chamber 2 or the occurrence of high-frequency pressure pulsation. Therefore, the electronic control device 12 for mixed hydrogen combustion needs to perform adjustment control such as reducing the supply amount of hydrogen before the engine 18 fails.

Such abnormal combustion of the engine 18 may occur under an environmental condition such as a change in the outside air temperature or at the time of a transient change of the engine 18. Therefore, the engine controller 11 and the electronic control device 12 for mixed hydrogen combustion need to detect combustion of the engine 18 in real time and ascertain whether or not combustion abnormality has occurred.

As another problem, in a case where the supply amount of the second fuel is small and the hydrogen mixing ratio is low, part of the second fuel containing the supplied hydrogen may not be combusted in the combustion chamber 2 and be discharged as is to outside the engine 18. In this case, there is no observable change in the combustion pressure waveform, like when the hydrogen mixing ratios 0% and 20% illustrated in FIG. 4 are compared. Under such conditions, because the hydrogen-containing second fuel does not contribute to combustion, the thermal efficiency of the engine 18 decreases. In addition, because unburned hydrogen is discharged to outside the engine 18, a safety problem also arises.

A case where hydrogen is discharged in an unburned state is likely to occur under a condition where the hydrogen mixing ratio is low. In comparison with a hydrocarbon fuel, hydrogen is a component that is easily combusted under an excess air condition, but when the excess air ratio of the air-fuel mixture of intake hydrogen and intake air is 8 to 10 or more, the condition is then outside the flammability range.

Therefore, in a case where the supply amount of the second fuel is small, hydrogen is discharged as is in an unburned state.

With respect to combustibility at a low hydrogen mixing ratio, the hydrogen mixing ratio, which serves as a threshold value at which unburned hydrogen is discharged, changes depending on the outside air temperature and the cooling water temperature. Furthermore, because the supercharging pressure and the temperature of the intake air also change depending on the operating conditions of the engine 18 such as the rotational speed and the torque of the engine 18, the hydrogen mixing ratio, which serves as the threshold value, also changes depending on the operating conditions of the engine 18.

Therefore, it is necessary to detect the combustion state in real time and ascertain the combustibility of hydrogen supplied to the combustion chamber 2.

Figure 6:
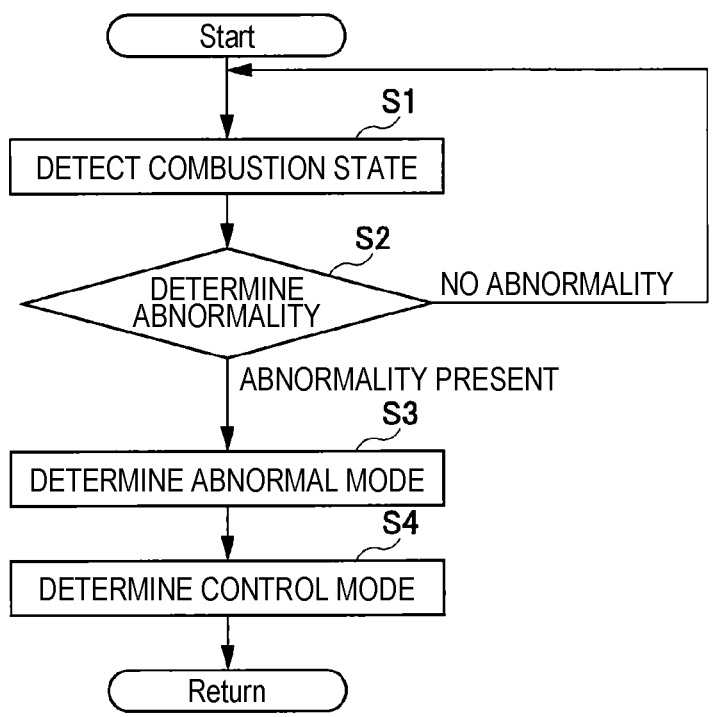
FIG. 6 is a flowchart illustrating an example of processing to perform abnormality determination of a combustion state of an engine and safely controlling the engine, according to the first embodiment of the present invention.

Therefore, the inventors of the present application invented the control flow illustrated in FIG. 6 in order to avoid abnormal combustion due to hydrogen and suppress unburned hydrogen in the mixed hydrogen combustion engine 18 that partially uses hydrogen as a fuel.

FIG. 6 is a flowchart illustrating an example of processing to perform an abnormality determination of a combustion state of an engine 18 and to safely control the engine 18. The processing illustrated in FIG. 6 illustrates an example of the hydrogen mixing ratio control method performed by the electronic control device 12 for mixed hydrogen combustion.

First, the combustion timing detection unit 21 detects the combustion state of the engine 18 in real time (S1). Therefore, the combustion timing detection unit 21 detects, based on various detection results inputted from the sensors 19, the combustion timing for each cycle as the combustion state of the engine 18. At this time, the combustion timing change rate calculation unit 21a is capable of reading the combustion timing time-series data 22a from the storage unit 22 and of calculating the combustion timing change rate. The combustion timing detection unit 21 then outputs the combustion state detection result to the abnormal state detection unit 24.

Next, the abnormal state detection unit 24 performs an abnormality determination of the engine 18 (S2). Here, the abnormal state detection unit 24 is capable of determining the presence or absence of an abnormality of the engine 18 on the basis of the second fuel supply ratio detected by the sensors 19, the combustion centroid timing detected by the combustion timing detection unit 21, and the threshold value determined by the threshold value determination unit 23. In a case where the abnormal state detection unit 24 determines that there is no abnormality in the engine 18 (no abnormality in S2), the processing returns to step S1 again, and the processing of FIG. 6 is repeated.

On the other hand, in a case where the abnormal state detection unit 24 determines that there is an abnormality in the engine 18 (there is an abnormality in S2), the abnormal mode determination unit 24a determines the abnormal mode on the basis of the second fuel supply ratio, the combustion centroid timing, and the threshold value (S3). The abnormal mode is determined according to which of the abnormal region numbers contains the combustion state of the engine 18. One abnormal mode may include a plurality of abnormal region numbers. The abnormal mode determined by the abnormal mode determination unit 24a is then outputted to the control mode determination unit 25.

The control mode determination unit 25 determines a control mode corresponding to the abnormal mode determined by the abnormal mode determination unit 24a (S4). The control mode determination unit 25 then controls the hydrogen generation device 5, the flow rate adjustment device 6, and the engine controller 11 according to the determined control mode. Therefore, the hydrogen generation device 5, the flow rate adjustment device 6, and the engine controller 11 operate cooperatively according to the control mode so that the combustion of the engine 18 attains a normal state.

A method of detecting the combustion state in step S1 of the processing illustrated in FIG. 6 will be described with reference to FIG. 7.

Figure 7:
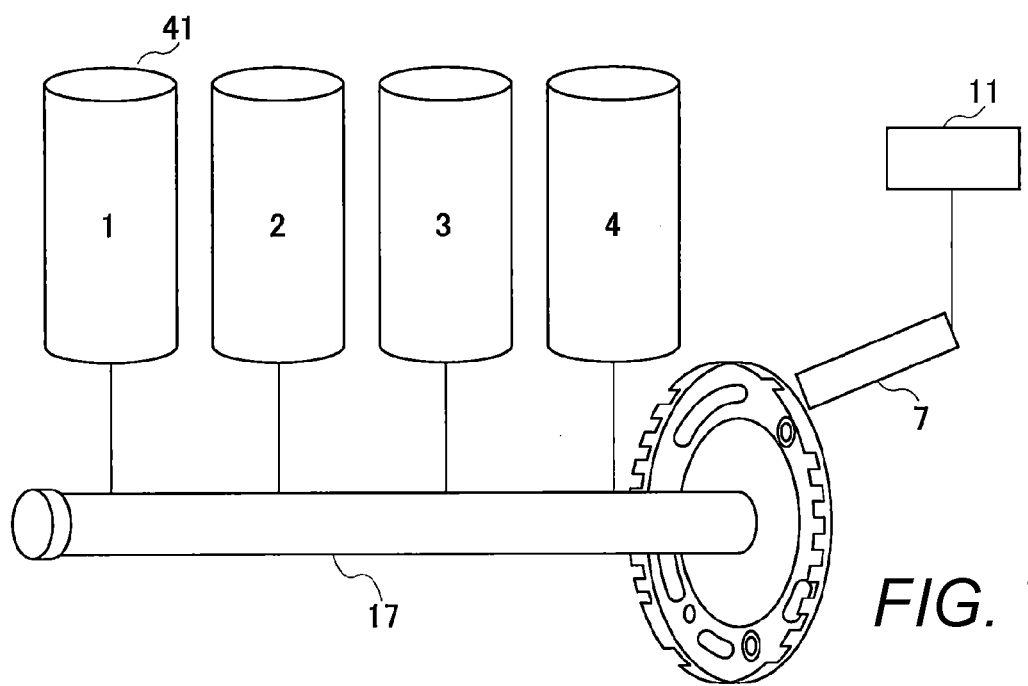
FIG. 7 is a diagram illustrating an arrangement example of an engine cylinder, a crankshaft, an electromagnetic pickup, and a controller according to the first embodiment of the present invention.

FIG. 7 is a diagram illustrating an arrangement example of an engine cylinder 41, the crankshaft 17, an electromagnetic pickup, and a controller. The four engine cylinders 41 illustrated in the drawing are denoted by numerical values "1" to "4".

In the combustion state detection method according to the present embodiment, the existing engine rotation sensor 7 and the cam rotation sensor 8 are utilized. The piston 1 and the cam are displaced in accordance with the rotation of the crankshaft 17.

As the engine rotation sensor 7, an electromagnetic pickup that detects a rotation angle of the crankshaft 17 is used.

The engine controller 11 and the electronic control device 12 for mixed hydrogen combustion then acquire the rotational speed of the engine 18 by using, as triggers, the rotation angle of the crankshaft 17 detected by the engine rotation sensor 7 and the rising or falling edge of the pulse outputted according to the rotation of the cam, which is detected by the cam rotation sensor 8.

Next, how the rotational speed of the engine 18 changes will be described with reference to FIG. 8.

Figure 8:
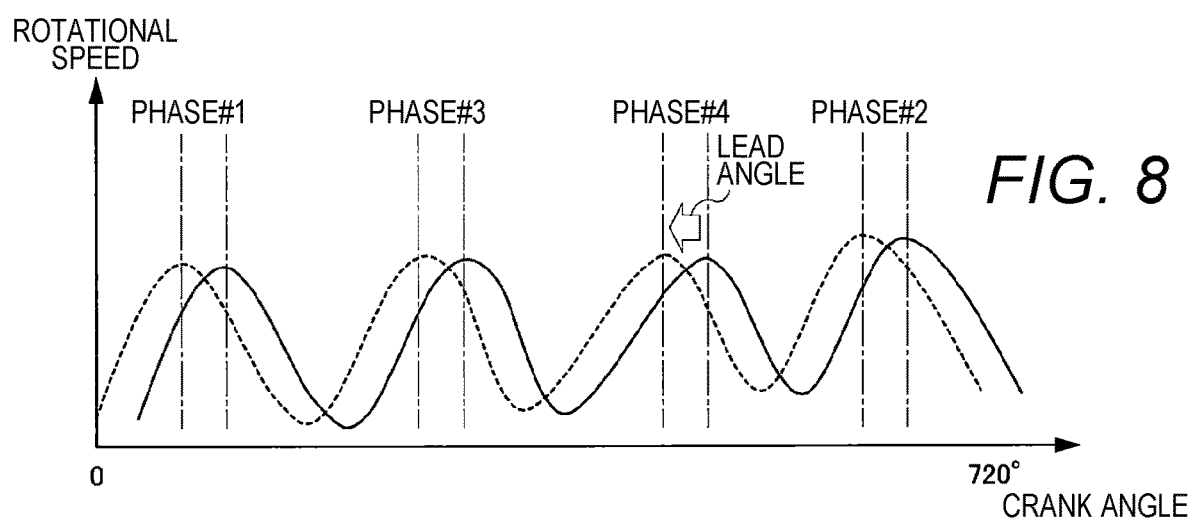
FIG. 8 is a diagram illustrating an example of a change in rotational speed in the in-line four-cylinder engine according to the first embodiment of the present invention.

FIG. 8 is a diagram illustrating an example of changes in rotational speed in an in-line four-cylinder engine. In FIG. 8, the horizontal axis represents the crank angle, and the vertical axis represents the rotational speed.

The rotational speed changes with a plurality of peak and valley amplitudes during a crank angle of 720 deg, which is one cycle of the engine 18. Therefore, the same number of amplitudes as the number of cylinders of the engine 18 connected to the crankshaft 17 on which the engine rotation sensor 7 is installed are generated within one cycle (crank angle: 0 to 720°). In the drawing, a state of a change in the rotational speed is illustrated together with phase numbers 1 to 4 (denoted as phases #1 to #4) assigned to each cylinder.

As described above, the engine controller 11 is capable of ascertaining the position of the amplitude on the basis of the rising or falling edge of the pulse outputted from the cam rotation sensor 8. Further, the engine controller 11 is capable of determining the cylinder by the number of edge counts of the engine rotation sensor 7 on the basis of the edges outputted from the cam rotation sensor 8. The cylinder determination results are inputted from the engine controller 11 to the electronic control device 12 for mixed hydrogen combustion, and are used, for example, in the determination of threshold values by the threshold value determination unit 23 or in the abnormality determination for each cylinder by the cylinder-specific abnormality determination unit 24*b*. The engine controller 11 is capable of ascertaining the peak position of the rotational speed of each cylinder from the edge count number. The peak position may be either a maximum value or a minimum value of the rotational speed.

As illustrated in FIG. 8, the rotational speed changes according to a torque change due to combustion of the engine 18. In addition, the timing of the change in rotational speed varies depending on the hydrogen mixing ratio.

Specifically, when the hydrogen mixing ratio increases, the center of gravity of heat generation through combustion advances as indicated by the outlined arrow in the drawing.

Here, the relationship between the rotational speed and the combustion centroid will be described with reference to FIG. 9.

Figure 9:
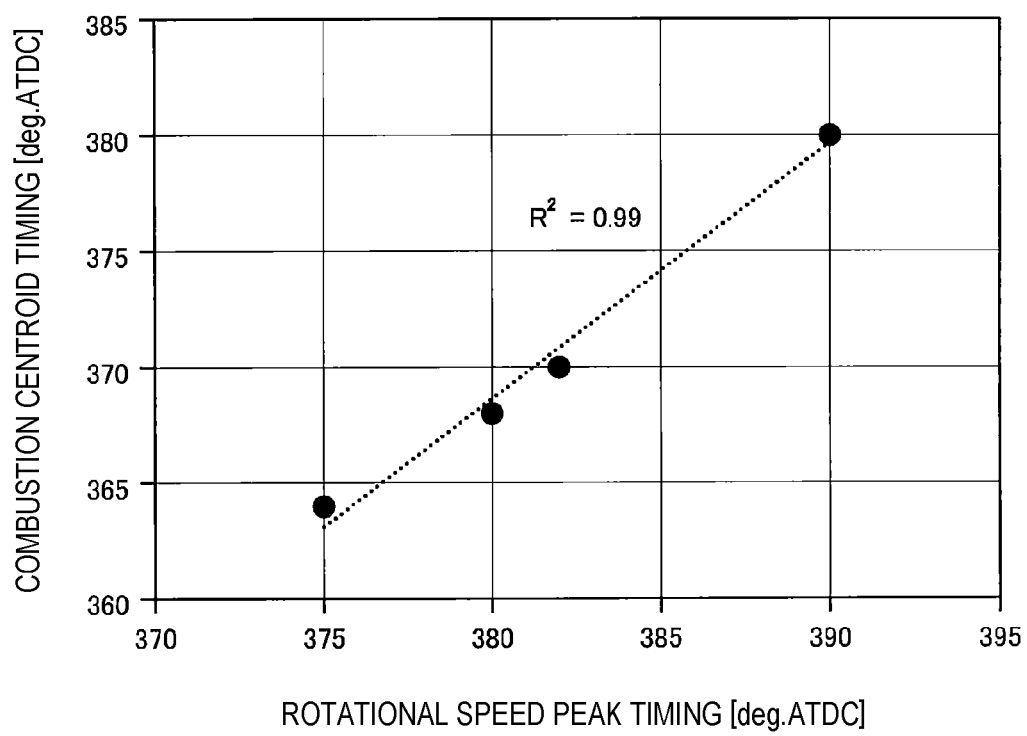
FIG. 9 is a diagram illustrating the relationship between rotational speed peak timing and combustion centroid timing according to the first embodiment of the present invention.

FIG. 9 is a diagram illustrating the relationship between rotational speed peak timing and combustion centroid timing.

In FIG. 9, the horizontal axis represents the peak timing of the rotational speed, and the vertical axis represents the combustion centroid timing.

The drawing shows that the determination coefficient $R^2$ is 0.99. The peak timing of the rotational speed illustrated in FIG. 9 corresponds to the value of the peak position of the rotational speed illustrated in FIG. 8.

As illustrated in FIG. 9, the peak timing of the rotational speed and the combustion centroid timing have a linear relationship. Therefore, the combustion timing detection unit 21 illustrated in FIG. 3 is capable, by ascertaining the rotational speed peak timing, of ascertaining a change in timing of the combustion centroid accompanying a change in the supply ratio of the hydrogen-containing second fuel.

Note that a combustion pressure sensor may be attached to the engine 18 (not illustrated in the drawings). In this case, the combustion timing detection unit 21 is capable of ascertaining the combustion centroid timing by using the pressure signal outputted according to the combustion pressure detected by the combustion pressure sensor, and the detection results of the engine rotation sensor 7 and the cam rotation sensor 8.

Next, a method of abnormality determination of the engine 18 will be described with reference to FIGS. 10 and 11.

FIG. 10 is a diagram illustrating an example of the abnormal region numbers of the engine 18 detected by the abnormal state detection unit 24.

FIG. 11 is a list illustrating correspondence relationships between operating conditions, phase determination results, abnormal region numbers, abnormal modes, and control modes, of the engine 18.

The abnormal mode determination unit 24*a* of the abnormal state detection unit 24 determines the abnormal mode by classifying the abnormal combustion into the abnormal regions 1 to 6 on the basis of the relationship between a combustion centroid timing Y estimated from the peak timing of the rotational speed by the combustion timing detection unit 21, and the supply ratio X of the second fuel. Hereinafter, a reference sign description and the respective relational expressions will be described.

$$Y = f_1(X, N, T)$$
$$X_1 = f_2(T, N, T_c, T_i, F_1, F_2)$$
$$X_2 = f_3(T, N, T_c, T_i, F_1, F_2)$$

-continued
$$Y_1 = f_4(T, N, T_c, T_i, F_1, F_2, X)$$
$$Y_2 = f_5(T, N, T_c, T_i, F_1, F_2, X)$$

Y: Combustion centroid timing
X: Second fuel supply ratio
$X_1$, $X_2$: Second fuel ratio threshold value of abnormal mode determination
$Y_1$, $Y_2$: Combustion centroid timing threshold value of abnormal mode determination
T: Torque of engine 18, torque of generator 50, or current value
N: Rotational speed of engine 18, rotational speed of generator 50, or voltage value
$T_c$: Water temperature of engine 18
$T_i$: Intake air temperature of engine 18
$F_1$: Type of first fuel
$F_2$: Type of second fuel FIG. 10 is a graph illustrating a relationship between the supply ratio (X) of the second fuel and the combustion centroid timing (Y). Here, the abnormal regions 1 to 6 are set at a timing later or earlier than the predetermined values of the threshold values $X_1$ and $X_2$ and the relational expression Y=$f_3$(X). Here, the threshold values $X_1$ and $X_2$ of the supply ratio (X) of the second fuel are threshold values for abnormality determination.

The threshold value determination unit 23 illustrated in FIG. 3 determines the threshold values $X_1$ and $X_2$ by using the engine speed (N), the torque (T) of the engine 18, the water temperature ($T_c$) of the engine 18, the intake air temperature ($T_i$) of the engine 18, the type ($F_1$) of the first fuel, and the type ($F_2$) of the second fuel. The threshold value determination unit 23 may determine the threshold values $X_1$ and $X_2$ by using the rotational speed or the voltage value of the generator 50 mechanically connected to the crankshaft 17 instead of the engine speed. In addition, the threshold value determination unit 23 may determine the threshold values $X_1$ and $X_2$ by using the torque or current value of a generator mechanically connected to the crankshaft 17 of the engine 18 instead of the torque of the engine 18.

When the timing (Y) of the combustion centroid is normal, the relational expression Y is expressed by a function Y=$f_1$(X, N, T) of the supply ratio (X) of the second fuel, the rotational speed N of the engine 18, and the torque T of the engine 18. Therefore, the abnormal state detection unit 24 determines that the combustion state is abnormal in a case where a lag angle (delay) equal to or greater than the threshold value $Y_1$ or a lead angle (premature) less than the threshold value $Y_2$ occurs from the value of the function Y. The threshold values $Y_1$ and $Y_2$ are determined by the engine speed (N), the torque (T) of the engine 18, the water temperature (T) of the engine 18, the intake air temperature ($T_i$) of the engine 18, the type ($F_1$) of the first fuel, the type ($F_2$) of the second fuel, and the second fuel supply ratio (X).

The abnormal regions 1, 3, and 5 illustrated in the drawing represent abnormalities for which the combustion centroid timing lags the timing obtained by adding the threshold value $Y_1$ to the combustion centroid timing (Y), which is expressed by the relational expression Y=$f_3$(X). Conversely, the abnormal regions 2, 4, and 6 illustrated in the drawing represent abnormalities for which the combustion centroid timing is earlier than the timing obtained by subtracting the threshold value $Y_2$ from the combustion centroid timing (Y).

Therefore, as illustrated in FIG. 11, the abnormal mode determination unit 24a determines the abnormal mode on the basis of the engine operating condition, the phase determination result, and the abnormal region number, and the control mode determination unit 25 determines the control mode on the basis of the abnormal mode. The engine operating conditions described below include steady-state operation or variable operation. In addition, as the phase determination result, there is a phase lag angle abnormality or a phase lead angle abnormality.

Hereinafter, examples of each abnormal mode and control modes corresponding to the abnormal modes will be sequentially described with reference to FIG. 11.

<During Steady-State Operation: Occurrence in Only Abnormal Region 1>

For example, during steady-state operation of the engine system 20 in which the engine speed and load of the engine 18 are stable for several seconds, the abnormal state detection unit 24 sometimes determines a combustion timing abnormality. As described above, in a case where the engine (engine 18) is operating in a steady state, the second fuel supply ratio is below the supply ratio threshold value, and a delay in the combustion timing equal to or greater than the combustion timing threshold value has occurred, and where the abnormal mode determination unit (abnormal mode determination unit 24a) determines, as the abnormal mode, that the second fuel supply ratio is equal to or greater than the supply ratio threshold value and that a delay in the combustion timing equal to or greater than the combustion timing threshold value has not occurred, the control mode determination unit (control mode determination unit 25) determines a control mode for performing control to increase the supply amount of the second fuel to the second fuel supply device.

For example, the control mode determination unit 25 uses the flow rate adjustment device 6 to adjust the supply amount of the second fuel, and thus the abnormal mode determination unit 24a ascertains the abnormal region number. Therefore, in the processing to extract the abnormal region number and determine the abnormal mode illustrated in FIG. 11, the control mode determination unit 25 changes the second fuel supply ratio (X) by 10 to 70%, for example, and determines the abnormal mode at the combustion centroid timing (Y) for each second fuel supply ratio.

Here, in a case where the abnormal mode determination unit 24a determines an abnormality only in the abnormal region 1, because no abnormality has occurred in the abnormal regions 3 and 5, it is possible to specify that the abnormal mode is misfire of the second fuel. That is, the abnormal mode determination unit 24a is capable of specifying that the lag in the combustion timing by a predetermined timing is due to second fuel misfire.

The misfire of the second fuel occurs, for example, due to any one of a low intake air temperature of the engine 18, an increase in humidity (moisture content) in the intake air, a decrease in the hydrogen mixing ratio in the second fuel, and an increase in the inert gas ratio. In a case where second fuel misfire occurs, the control mode determination unit 25 performs control to increase the supply amount of the second fuel. Through this control, the excess air ratio of the air-fuel mixture supplied to the engine 18 decreases, and the hydrogen-containing second fuel enters the flammability range, and it is thus possible to prevent misfire and to return to the normal combustion mode.

<During Steady-State Operation: Occurrence in Abnormal Regions 1, 3, and 5>

In a case where the engine (engine 18) is operating in a steady state and the abnormal mode determination unit (abnormal mode determination unit 24a) determines, as the abnormal mode, that a delay in the combustion timing equal to or greater than the combustion timing threshold value has occurred, and where the occurrence of an abnormality is detected in all the cylinders by the cylinder-specific abnormality determination unit (cylinder-specific abnormality determination unit 24b), the control mode determination unit (control mode determination unit 25) determines the control mode for performing control to expedite the injection timing of the first fuel. In a case where the occurrence of an abnormality is detected in some cylinders by the cylinder-specific abnormality determination unit (the cylinder-specific abnormality determination unit 24b), the control mode determination unit (the control mode determination unit 25) determines the control mode for performing at least one or more of control to switch the type of the first fuel supplied from the first fuel supply device and control to post an abnormality flag of the injection device (the injector 4) of the first fuel. The control to switch the first fuel type by the control mode determination unit 25 is performed for all the cylinders.

As described above, there is a case where the abnormal state detection unit 24 determines an abnormality of the combustion timing during steady-state operation in which the speed and the load of the engine 18 are stable, and where the cylinder-specific abnormality determination unit 24b confirms the occurrence of the abnormal regions 1, 3, and 5 in all the cylinders. Such an abnormality is caused by a drop in the hydrogen concentration of the second fuel. Therefore, the control mode determination unit 25 performs control to advance the first fuel injection timing.

In a case where the cylinder-specific abnormality determination unit 24b confirms the occurrence of the abnormal regions 1, 3, and 5 in some cylinders, an injector injection abnormality of the first fuel has then occurred in the cylinder in which the abnormality has occurred. Specifically, this abnormality occurs when the injector 4 of the first fuel is incapable of injecting a predetermined injection amount at a predetermined injection timing.

Such an abnormality occurs due to a deposit on the tip of the injector 4 and also occurs due to deterioration of the internal material of the injector 4. Therefore, the control mode determination unit 25 implements switching of the first fuel. Specifically, the control mode determination unit 25 switches the first fuel currently in use to fuel having one or more of the characteristics of a low-viscosity fuel, a low-boiling point fuel, and a low oxygenated fuel. For example, in a case where a bio-oil fuel is used as the first fuel, the control mode determination unit 25 switches to any one of BDF, synthetic fuel, and light oil. For example, in a case where BDF or synthetic fuel is used as the first fuel, the control mode determination unit 25 switches to light oil. By changing the first fuel used in the engine 18 to a fuel having a lower viscosity and a lower boiling point than the fuel before switching, atomization and vaporization of the spray injected from the injector 4 are promoted, and deposits on the tip of the injector 4 are less likely to occur.

When the same injection timing of the first fuel before and after the switching are compared, the viscosity of the first fuel after the switching is lower than the viscosity of the first fuel before the switching, and hence the combustion speed of the first fuel after the switching is increased, and the combustion temperature of the first fuel can be increased. In addition, when the first fuel is switched to the low oxygenated fuel, the calorific value per unit volume of fuel can be increased, and therefore the timing for increasing the amount of heat of the first fuel supplied to the engine 18 is accelerated with the same injection timing of the first fuel. As a result, the combustion timing is accelerated, and the combustion temperature of the first fuel after switching can be increased. When the combustion temperature of the first fuel after switching can be increased in this manner, the generation of deposits at the tip of the injector 4 is suppressed. In addition, the deposit present at the tip of the injector 4 can be burned and reduced.

Note that, in a case where the same abnormal mode (abnormality occurring in the abnormal regions 1, 3, and 5) occurs even after switching the first fuel, the abnormal state detection unit 24 sets an injector abnormality flag.

The abnormal state detection unit 24 then notifies the user of the occurrence of an abnormality in the injector 4, and also notifies the engine controller 11 and the energy management system 13 of the occurrence of an abnormality in the injector 4.

<During Steady-State Operation: Occurrence in Abnormal Regions 2, 4, and 6>

There is a case where the abnormal state detection unit 24 has determined an abnormality of the combustion timing during steady-state operation in which the rotational speed and the load of the engine 18 are stable, and where the cylinder-specific abnormality determination unit 24b has confirmed the occurrence in the abnormal regions 2, 4, and 6 in all the cylinders. In this case, the combustion timing detection unit 21 illustrated in FIG. 3 confirms, based on past time-series data, whether a timing abnormality has occurred due to a long-term temporal change or a short-term transient change. Specifically, the combustion timing change rate calculation unit 21a of the combustion timing detection unit 21 calculates the change rate of the combustion timing by referring to the combustion timing time-series data 22a. The combustion timing change rate calculation unit 21a then determines (1) a long-term temporal change in a case where the change rate of the combustion timing is less than a predetermined value, and determines (2) a short-term transient change in a case where the change rate of the combustion timing is equal to or greater than the predetermined value.

(1) Long-Term Temporal Changes

The reason why the combustion timing is subject to long-term temporal changes is that the actual compression ratio in the engine 18 increases due to the accumulation of impurities and the like in the combustion chamber 2 and the exhaust path. Specifically, when the engine 18 is operated for a predetermined period, ash, which is an inorganic compound caused by oil, is gradually accumulated in the piston 1 and the exhaust pipe in the engine 18. In addition, deposits that are combustion residues are accumulated in the injector 4, the exhaust valve, and the like. When these ash and deposits are accumulated in the engine 18, the actual compression ratio becomes high, which results in earlier combustion timing, and an abnormality in the timing lead angle occurs.

Therefore, in a case where the engine (engine 18) is operating in a steady state, and premature combustion timing below the combustion timing threshold value has occurred, and where the abnormal mode determination unit (abnormal mode determination unit 24a) determines, as the abnormal mode, that the change rate of the combustion timing is equal to or greater than the change rate threshold value (long-term temporal change) determined by the threshold value determination unit (threshold value determination unit 23), the control mode determination unit (control mode determination unit 25) determines the control mode for performing at least one or more of control to stop the supply of the second fuel from the second fuel supply device and control to output a maintenance requirement notification to the second fuel supply device. For example, the control mode determination unit 25 performs (A) first fuel switching control or (B) second fuel supply amount control. (A) First fuel switching control or (B) Second fuel supply amount control by the control mode determination unit 25 is performed for all cylinders.

In a case where an abnormality of the timing lead angle is not avoided even when the above control is performed, the abnormal state detection unit 24 notifies the user of the timing lead angle abnormality and also notifies the engine controller 11 and the energy management system 13 of the timing lead angle abnormality.

(A) First Fuel Switching Control

In the case of first fuel switching control, the control mode determination unit 25 switches the first fuel currently in use to fuel having one or more of the characteristics of a low-viscosity fuel, a low-boiling point fuel, and a low oxygenated fuel. Specifically, in the case of a bio-oil fuel, the fuel is switched to any one of BDF, synthetic fuel, and light oil. For example, in a case where BDF or synthetic fuel is used as the first fuel, the control mode determination unit 25 switches to light oil.

The control mode determination unit 25 switches the first fuel used in the engine 18 to a fuel having a lower viscosity and a lower boiling point than the fuel before the switching, thereby promoting atomization and vaporization of the spray injected from the injector 4. Therefore, at the same injection timing of the first fuel before and after the switching, the timing of self-ignition of the first fuel after the switching is accelerated, and the combustion temperature is increased. In addition, when the first fuel is switched to the low oxygenated fuel, the calorific value per unit volume of fuel can be increased, and therefore the timing for increasing the amount of heat of the first fuel supplied to the engine 18 is accelerated in the same injection period of the first fuel. When the combustion timing of the first fuel after switching is accelerated and the combustion temperature can be increased in this way, the generation of ash and deposits is suppressed. In addition, the deposit present at the tip of the injector 4 can be burned and reduced.

(B) Second Fuel Supply Amount Control

In the case of controlling the supply amount of the second fuel, the control mode determination unit 25 selects the second fuel supply ratio having a low change rate of the combustion centroid timing by looking at the relationship between the temporal change of the combustion centroid timing and the second fuel supply ratio. The abnormal state detection unit 24 then performs maintenance notification of the engine 18 in a case where the time-series change rate of the combustion centroid timing calculated by the combustion timing change rate calculation unit 21a exceeds a predetermined value. Specifically, the abnormal state detection unit 24 alerts the user to stop the engine 18 and perform an overhaul of the engine 18.

(2) Short-Term Transient Change

In a case where the combustion timing change rate calculation unit 21a determines that the change in combustion timing is a short-term transient change, the change in combustion timing occurs due to a component abnormality of the second fuel. For example, in a case where the hydrogen concentration of the second fuel is equal to or greater than a predetermined value, or where oxygen is mixed into the second fuel, a change in the combustion timing occurs.

(Occurrence of Abnormality Due to Age-Related Deterioration of Sealing Material or the Like)

For example, in a case where the hydrogen generation device 5 is an electrolysis device, the hydrogen generation device 5 is a system that generates hydrogen and oxygen from water by means of electric power. Oxygen and hydrogen are generated in different chambers, but when aging or the like occurs in a sealing material or the like at a boundary between the chambers, oxygen is mixed into hydrogen. When oxygen is mixed into the second fuel, the oxygen concentration in the combustion chamber 2 increases, and hence the combustion speed increases, and consequently the combustion centroid timing is in advance of the predetermined timing.

Therefore, in a case where the engine (engine 18) is operating in a steady state, and premature combustion timing below the combustion timing threshold value has occurred, and where the abnormal mode determination unit (abnormal mode determination unit 24a) determines, as the abnormal mode, that the change rate of the combustion timing is below the change rate threshold value (short-term temporal change) determined by the threshold value determination unit, the control mode determination unit (control mode determination unit 25) determines the control mode for performing at least one or more of control to switch the type of the first fuel supplied from the first fuel supply device, control to stop the supply of the second fuel from the second fuel supply device, and control to output a maintenance requirement notification for the engine (engine 18). For example, the control mode determination unit 25 performs control to stop the supply of the second fuel in a case where the change rate of the combustion centroid timing calculated by the combustion timing change rate calculation unit 21a exceeds a predetermined value. The abnormal state detection unit 24 then notifies the user to perform servicing and maintenance of the hydrogen generation device 5.

(Occurrence of Abnormality Due to Second Fuel Component Abnormality)

However, in a case where the abnormalities shown in the abnormal regions 2, 4, and 6 occur in a short period (transient) instead of aging of the sealing material or the like provided at the boundary between the oxygen and hydrogen chambers, it means that a component abnormality of the second fuel has occurred. Such an abnormality is, for example, an event that occurs in a case where the hydrogen concentration in the second fuel becomes higher than a predetermined value or in a case where oxygen is mixed into the second fuel.

For example, in a case where the hydrogen generation device 5 is a water electrolysis device and an abnormality occurs in the water electrolysis device, an air-fuel mixture in which oxygen is mixed in hydrogen generated by the hydrogen generation device 5 is supplied to the engine 18. Because oxygen increases the combustion speed, the combustion centroid timing is then premature, and as a result, the abnormalities shown in the abnormal regions 2, 4, and 6 occur. In a case where such an abnormality occurs, the control mode determination unit 25 must stop the supply of the second fuel and perform servicing and maintenance of the hydrogen supply device.

Although a water electrolysis device has been illustrated as an example of the hydrogen generation device 5, an abnormality flag of the second fuel supply is set even in a case where a predetermined amount or more of hydrogen is generated in a case where a reformer is used as the hydrogen generation device 5. Therefore, the control mode determination unit 25 performs control of the reformer similarly to the above-described control of the water electrolysis device.

<During Steady-State Operation: Occurrence in Abnormal Region 6>

In a case where the combustion timing detection unit 21 determines a combustion timing abnormality during steady-state operation in which the rotational speed and the power generation load of the engine 18 are stable and where the cylinder-specific abnormality determination unit 24b confirms the occurrence of the abnormal region 6 in all the cylinders, the abnormal mode determination unit 24a determines an abnormal mode in which abnormal combustion such as knocking or pre-ignition occurs. As described above, in a case where the engine (engine 18) is operating in a steady state, the second fuel supply ratio is equal to or greater than the supply ratio threshold value, and premature combustion timing below the combustion timing threshold value has occurred, and where the abnormal mode determination unit (abnormal mode determination unit 24a) determines, as the abnormal mode, that the second fuel supply ratio is below the supply ratio threshold value and premature combustion timing below the combustion timing threshold value has not occurred, the control mode determination unit (control mode determination unit 25) determines the control mode for performing at least one or more of control to reduce the supply amount of the second fuel to the second fuel supply device, and control to delay the ignition timing of the ignition device of the first fuel.

When the supply ratio of hydrogen in the second fuel is high, in some cases, pre-ignition, which involves hydrogen coming into contact with a hot component in the combustion chamber 2, occurs. In addition, the air-fuel mixture of the second fuel is ignited by the combustion of the first fuel, but when the hydrogen mixing ratio of the second fuel is high, the air-fuel mixture self-ignites and combusts, and knocking may occur. When abnormal combustion occurs as described above, the control mode determination unit 25 is capable of avoiding knocking by, for example, performing one or more of control to reduce the ratio of the second fuel at the time of the knocking and retard the first fuel injection timing. In addition, when pre-ignition occurs, the control mode determination unit 25 is capable of avoiding pre-ignition by means of a control mode for reducing the hydrogen mixing ratio in the combustion chamber by reducing the second fuel ratio.

<During Variable Operation: Occurrence in any Region>

For example, the abnormality occurring in any region during the variable operation of the engine system 20, in which one or more of the engine speed, the power generation load of the generator 50, and the supply amount of the second fuel change within several seconds, results from low responsiveness of the first fuel injection control. Therefore, the abnormal mode determination unit 24a determines such an abnormality as an abnormality of the fuel injection system of the first fuel. In the fuel injection system of the first fuel, for example, the responsiveness of adjustment of the fuel injection pressure is reduced due to clogging of the fuel filter or the fuel pipe or an abnormality of the fuel pump, and as a result, an abnormality of the combustion timing occurs.

Therefore, in a case where the engine (engine 18) is operating variably, and the abnormal mode determination unit (abnormal mode determination unit 24a) determines, as the abnormal mode, that while the second fuel supply ratio is changing, a delay in the combustion timing equal to or greater than the combustion timing threshold value has occurred or premature combustion timing below the combustion timing threshold value has occurred, the control mode determination unit (control mode determination unit 25) determines the control mode for performing at least one or more of control to switch the type of the first fuel supplied from the first fuel supply device and control to output a maintenance requirement notification for the engine (engine 18). The control to switch the first fuel type by the control mode determination unit 25 is performed for all the cylinders.

For example, when an abnormality occurs during variable operation, the control mode determination unit 25 switches the first fuel to a fuel having at least one or more of the characteristics of a low-viscosity fuel, a low-boiling point fuel, and a low oxygenated fuel. For example, in a case where a bio-oil fuel is used as the first fuel, the control mode determination unit 25 switches to any one of BDF, synthetic fuel, and light oil. For example, in a case where BDF or synthetic fuel is used as the first fuel, the control mode determination unit 25 switches to light oil. By changing the first fuel used in the engine 18 to a fuel having a lower viscosity and a lower boiling point than the fuel before switching, the responsiveness of the discharge amount control by the fuel pump is enhanced, and the responsiveness of the adjustment of the fuel injection pressure is improved.

When the first fuel is switched to the low oxygenated fuel, the calorific value per unit volume of the fuel can be increased, and hence the discharge amount from the fuel pump can be reduced, and consequently the responsiveness of adjustment of the fuel injection pressure can be improved. In addition, by using the low oxygenated fuel, it is possible to suppress deterioration of the sealing material in the middle of the fuel pipe and the generation of impurities around the fuel pump, and as a result, it is possible to suppress the reduction in the responsiveness of the fuel injection pressure adjustment.

As described above, in a case where the same abnormal mode occurs in a predetermined period even after the control mode determination unit 25 switches the first fuel, the abnormal state detection unit 24 flags the fuel injection-system abnormality to notify the user of the occurrence of the abnormality in the fuel injection system, and also notifies the engine controller 11 and the energy management system 13 of the occurrence of the abnormality in the fuel injection system.

Therefore, when it is detected that an abnormality has occurred in the engine 18, the shift to a servicing mode is performed. The servicing mode is an operation mode for safely operating the engine 18. For example, at least one of processing in which the abnormal state detection unit 24 notifies the user of maintenance for engine failure, processing in which the control mode determination unit 25 cuts off the supply of hydrogen to the engine 18, and processing in which the control mode determination unit 25 lowers the engine output is performed in the servicing mode.

(Operation of Energy Management System)

Here, a control operation of the energy management system 13 will be described.

As described above, the electronic control device 12 for mixed hydrogen combustion has a function for communicating information with the energy management system 13 which includes renewable energy. Furthermore, based on the energy demand-supply balance of the energy management system 13, the electronic control device 12 for mixed hydrogen combustion controls the flow rate adjustment device 6 and the hydrogen generation device 5, the switching unit 16, the torque and rotational speed of the engine 18, and the torque or current value and the rotational speed of the generator 50.

Figure 12:
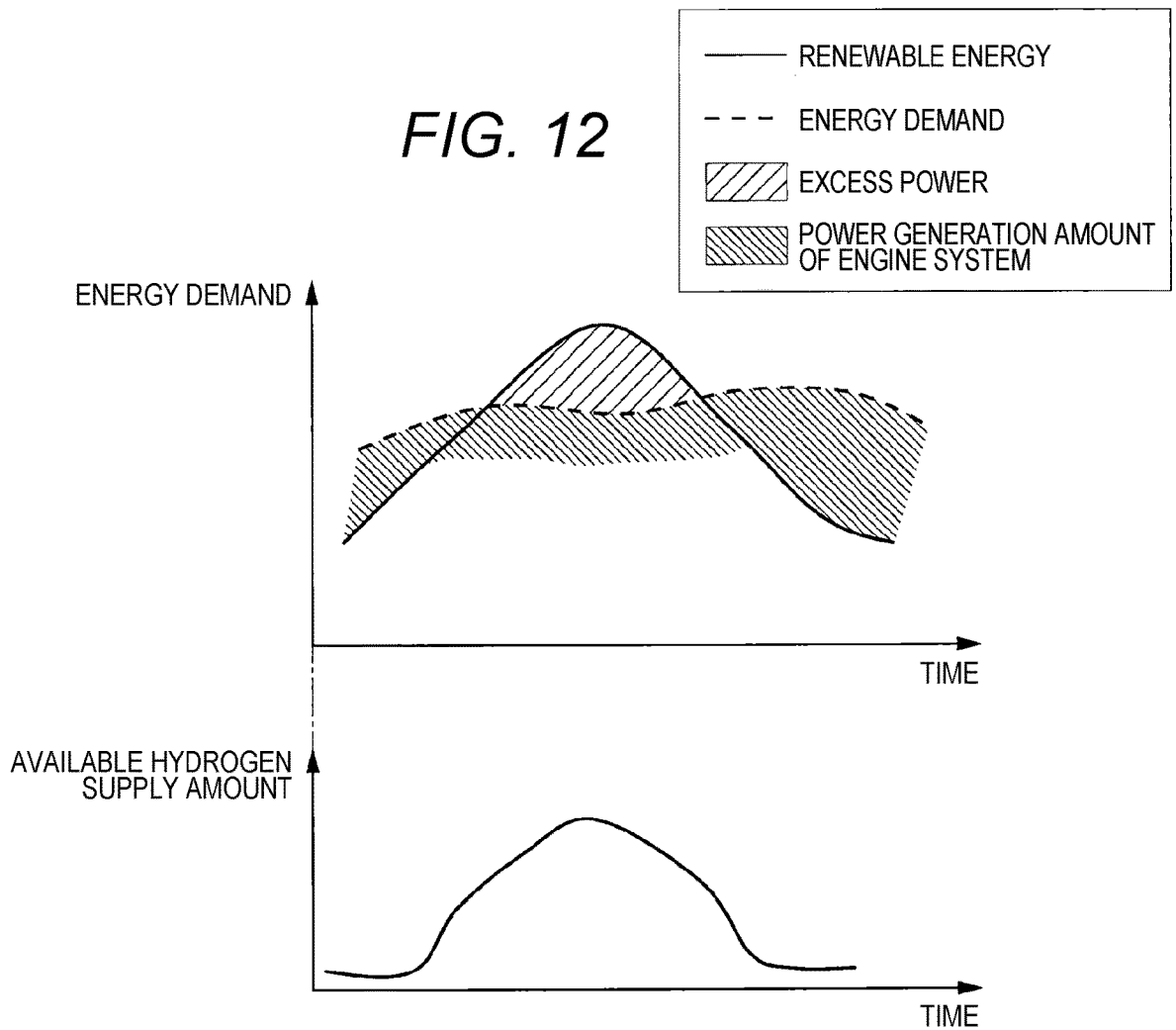
FIG. 12 is a diagram illustrating the relationship between energy supply and demand and an available hydrogen supply amount according to the first embodiment of the present invention.

FIG. 12 is a diagram illustrating the relationship between energy supply and demand and an available hydrogen supply amount. The horizontal axis in FIG. 12 represents time.

As illustrated in the energy supply and demand graph in the upper part of FIG. 12, in some cases renewable energy (solid line) that is weather-dependent such as solar power generation generates more power than the energy demand (broken line) because the power generation amount fluctuates. There are time zones in which renewable energy which is generated in a greater amount than the energy demand becomes surplus power, and hence hydrogen is generated from the surplus power by using the hydrogen generation device 5. Therefore, as illustrated in the graph of the available hydrogen supply amount shown in the lower part of FIG. 12, the available hydrogen supply amount increases as the surplus power increases.

The electronic control device 12 for mixed hydrogen combustion communicates the state of the engine system 20 and the content of the control to be performed to the energy management system 13, and thus the amount of hydrogen that can be received (referred to as the "hydrogen receivable amount") on the engine 18 side is determined. The energy management system 13 is capable of determining the hydrogen generation amount of hydrogen generated by the hydrogen generation device 5 on the basis of the available hydrogen supply amount determined by the energy demand-supply balance and the hydrogen receivable amount on the engine 18 side.

In the electronic control device 12 for mixed hydrogen combustion according to the first embodiment described above, the combustion centroid timing is detected in real time based on the information detected by the existing sensors 19 attached to the engine 18, and various combustion abnormal modes are determined when an abnormality occurs in the engine 18. Further, a control mode for controlling the engine system 20 is determined based on the abnormal mode thus determined. As the control mode, in addition to the control to adjust the hydrogen mixing ratio, various control methods which correspond to the combustion state, such as control to transition to the servicing mode, are performed. For example, the electronic control device 12 for mixed hydrogen combustion reduces the amount of hydrogen supplied to the engine 18 or reduces the output of the engine 18. In this case, the electronic control device 12 for mixed hydrogen combustion does not place a burden on the engine 18 and maximizes the amount of hydrogen supplied to the engine 18. The electronic control device 12 for mixed hydrogen combustion is capable of efficiently controlling the engine 18 and enables the engine 18 to be used for a long time.

In a case where an abnormality of the engine 18 occurs, the electronic control device 12 for mixed hydrogen combustion outputs a maintenance requirement notification for the engine 18 to the user. Therefore, the user is able to perform an inspection, an overhaul, and the like of the engine 18, and resolve an abnormality of the engine 18 at an early stage.

The combustion state of the engine 18 is determined using the information detected by the sensors 19 already installed in the engine system 20. Thus, there is no need to machine the engine 18 and attach a new in-cylinder pressure sensor. In addition, because an in-cylinder pressure sensor is not provided in the combustion chamber 2, no work is generated to replace an in-cylinder pressure sensor which has deteriorated in the combustion chamber 2.

The combustion timing detected by the combustion timing detection unit 21 need not be limited to the combustion centroid timing representing the combustion phase at which the combustion mass ratio is 50%. The combustion timing detection unit 21 may detect an arbitrary combustion timing, and the threshold value determination unit 23 may determine the threshold value based on the arbitrary combustion timing.

Modification

The engine system 20 according to the above-described embodiment is, for example, a stationary-type engine system installed in a factory, but may also be an engine system mounted in a vehicle. The engine system 20 may also be applied to an engine control unit (ECU).

The relational expression, the supply ratio threshold value, and the combustion timing threshold value illustrated in FIG. 10 may also be obtained by machine learning. The relational expression, the supply ratio threshold value, and the combustion timing threshold value, which are machine-learned using a certain engine system 20 can also be applied to other engine systems 20 to improve the performance of a plurality of engine systems 20 managed by the energy management system 13.

In FIG. 10, six abnormal regions representing abnormality 1 to abnormality 6 are provided, but the content of the abnormalities may be further subdivided or may be roughly divided. For example, four abnormal regions can be provided by setting one supply ratio threshold value. By roughly dividing the abnormal regions, control of the engine 18 can be expedited. In addition, eight abnormal regions can be provided by setting three supply ratio threshold values. By subdividing the abnormal regions, the engine 18 can be controlled more finely.

Note that the present invention is not limited to or by the embodiments described above, and it is understood that various other application examples and modifications can be adopted without departing from the spirit of the present invention set forth in the claims.

For example, in each of the above-described embodiments, the configuration of the system has been described in detail and in specific terms in order to describe the present invention in a manner which is easy to understand, but the present invention is not necessarily limited to a system including all the described configurations. In addition, it is also possible to add or delete other configurations to/from some of the configurations of each embodiment, or to replace some of said configurations.

Moreover, control lines and information lines that are considered necessary for the sake of the description are illustrated, but not all control lines and information lines required for implementation are necessarily illustrated. In practice, almost all the configurations may be considered to be interconnected.

REFERENCE SIGNS LIST 1 piston
2 combustion chamber
4 injector
5 hydrogen generation device
6 flow rate adjustment device
11 engine controller
12 electronic control device for mixed hydrogen combustion
13 energy management system
14, 15 fuel tank
16 switching unit
18 engine
20 engine system
21 combustion timing detection unit
21a combustion timing change rate calculation unit
22 storage unit
22a combustion timing time-series data
22b threshold value
23 threshold value determination unit
24 abnormal state detection unit
24a abnormal mode determination unit
24b cylinder-specific abnormality determination unit
25 control mode determination unit

The invention claimed is:

1. An electronic control device for mixed hydrogen combustion that controls a mixing ratio of hydrogen mixed in a combustion chamber of a mixed hydrogen combustion engine having a first fuel supply device that supplies a hydrocarbon fuel to the engine as a first fuel and a second fuel supply device that supplies a fuel partially containing hydrogen to the engine as a second fuel, the electronic control device for mixed hydrogen combustion comprising:
  a combustion timing detection unit that detects a combustion timing of the engine;
  an abnormal state detection unit that detects an abnormal state in which a type of an abnormality occurring in the engine is determined based on the combustion timing, a supply amount of the hydrocarbon fuel supplied by the first fuel supply device, and a second fuel supply ratio calculated from a supply amount of the second fuel supplied by the second fuel supply device; and
  a control mode determination unit that determines a control mode corresponding to the abnormal state, controls a supply amount of the hydrogen supplied by the second fuel supply device on the basis of the control mode, and outputs the control mode to an engine controller that controls the engine.

2. The electronic control device for mixed hydrogen combustion according to claim 1,
  wherein the abnormal state detection unit includes an abnormal mode determination unit that determines, as an abnormal mode, one or a plurality of abnormal states occurring in the engine on the basis of a magnitude of the second fuel supply ratio with respect to a supply ratio threshold value of the second fuel, and an occurrence of a delayed or premature combustion timing, which is determined from a combustion timing threshold value which takes, as a reference, a normal combustion timing with respect to the second fuel supply ratio.

3. The electronic control device for mixed hydrogen combustion according to claim 2, further comprising:
  a threshold value determination unit that determines the supply ratio threshold value and the combustion timing threshold value on the basis of at least one or more of a rotational speed of the engine, a torque of the engine, a rotational speed of a generator mechanically connected to the engine, a voltage of the generator, a current of the generator, a torque of the generator, a water temperature of the engine, an intake air temperature of the engine, a type of the first fuel, and a type of the second fuel.

4. The electronic control device for mixed hydrogen combustion according to claim 3,
wherein, in a case that the engine is operating in a steady state, the second fuel supply ratio is below the supply ratio threshold value, and a delay has occurred in the combustion timing that is equal to or greater than the combustion timing threshold value, and
wherein, in a case that the abnormal mode determination unit determines, as the abnormal mode, that the second fuel supply ratio is equal to or greater than the supply ratio threshold value and that a delay in the combustion timing equal to or greater than the combustion timing threshold value has not occurred, the control mode determination unit determines the control mode for performing control to increase the supply amount of the second fuel to the second fuel supply device.

5. The electronic control device for mixed hydrogen combustion according to claim 3,
wherein, in a case that the engine is operating in a steady state, the second fuel supply ratio is equal to or greater than the supply ratio threshold value, and a premature combustion timing below the combustion timing threshold value has occurred, and
wherein, in a case that the abnormal mode determination unit determines, as the abnormal mode, that the second fuel supply ratio is below the supply ratio threshold value and the premature combustion timing below the combustion timing threshold value has not occurred, the control mode determination unit determines the control mode for performing at least one or more of control to reduce the supply amount of the second fuel to the second fuel supply device, and control to delay an ignition timing of an ignition device of the first fuel.

6. The electronic control device for mixed hydrogen combustion according to claim 3,
wherein the abnormal state detection unit includes a cylinder-specific abnormality determination unit that determines the abnormal state for each cylinder of the engine.

7. The electronic control device for mixed hydrogen combustion according to claim 6,
wherein, in a case that the engine is operating in a steady state and the abnormal mode determination unit determines, as the abnormal mode, that a delay in the combustion timing equal to or greater than the combustion timing threshold value has occurred, and where the occurrence of an abnormality is detected in all the cylinders by the cylinder-specific abnormality determination unit, the control mode determination unit determines the control mode for performing control to expedite the injection timing of the first fuel, and
wherein in a case that the occurrence of an abnormality is detected in some cylinders by the cylinder-specific abnormality determination unit, the control mode determination unit determines the control mode for performing at least one or more of control to switch the type of the first fuel supplied from the first fuel supply device and control to post an abnormality flag of the injection device of the first fuel.

8. The electronic control device for mixed hydrogen combustion according to claim 3,
wherein the combustion timing detection unit includes a combustion timing change rate calculation unit that calculates a change rate of the combustion timing on the basis of time-series data of the combustion timing detected in the past.

9. The electronic control device for mixed hydrogen combustion according to claim 8,
wherein, in a case that the engine is operating in a steady state, and the abnormal mode determination unit determines, as the abnormal mode, that a premature combustion timing below the combustion timing threshold value has occurred, and where the change rate of the combustion timing is equal to or greater than a change rate threshold value determined by the threshold value determination unit, the control mode determination unit determines the control mode for performing at least one or more of control to stop the supply of the second fuel from the second fuel supply device and control to output a maintenance requirement notification to the second fuel supply device.

10. The electronic control device for mixed hydrogen combustion according to claim 8,
wherein, in a case where the engine is operating in a steady state, and the premature combustion timing below the combustion timing threshold value has occurred, and where the abnormal mode determination unit determines, as the abnormal mode, that the change rate of the combustion timing is below the change rate threshold value determined by the threshold value determination unit, the control mode determination unit determines the control mode for performing at least one or more of control to switch the type of the first fuel supplied from the first fuel supply device, control to stop the supply of the second fuel from the second fuel supply device, and control to output a maintenance requirement notification for the engine.

11. The electronic control device for mixed hydrogen combustion according to claim 3,
wherein, in a case that the engine is operating variably, and the abnormal mode determination unit determines, as the abnormal mode, that while the second fuel supply ratio is changing, a delay in the combustion timing equal to or greater than the combustion timing threshold value has occurred or a premature combustion timing below the combustion timing threshold value has occurred, the control mode determination unit determines the control mode for performing at least one or more of control to switch the type of the first fuel supplied from the first fuel supply device and control to output a maintenance requirement notification for the engine.

12. The electronic control device for mixed hydrogen combustion according to claim 1,
wherein the combustion timing detection unit detects the combustion timing by using at least one or more of information outputted from an engine rotation sensor for detecting changes in the rotation of the engine and information outputted from a cam sensor for detecting changes in the rotation of a cam shaft of the engine.

13. The electronic control device for mixed hydrogen combustion according to claim 1,
wherein the second fuel supply ratio, a power output of a generator mechanically connected to the engine, an amount of heat recovered from exhaust heat of the engine, and an abnormal state or a control state of the engine are sent and received through communication with an energy management system that controls renewable energy.

14. A hydrogen mixing ratio control method for controlling a mixing ratio of hydrogen mixed in a combustion chamber of a mixed hydrogen combustion engine having a first fuel supply device that supplies a hydrocarbon fuel to the engine as a first fuel and a second fuel supply device that supplies a fuel partially containing hydrogen to the engine as a second fuel, the method comprising:

processing to detect a combustion timing of the engine;

processing to detect an abnormal state in which a type of an abnormality occurring in the engine is determined based on the combustion timing, a supply amount of the hydrocarbon fuel supplied by the first fuel supply device, and a second fuel supply ratio calculated from a supply amount of the second fuel supplied by the second fuel supply device; and processing to determine a control mode corresponding to the detected abnormal state, control a supply amount of the hydrogen supplied by the second fuel supply device on the basis of the control mode, and output the control mode to an engine controller that controls the engine.

* * * * *